US012750419B2

(12) United States Patent
Hu et al.

(10) Patent No.: US 12,750,419 B2
(45) Date of Patent: Sep. 29, 2026

(54) GENERATING SOFTWARE DEVELOPMENT LIFE CYCLE (SDLC)-BASED APPLICATION SEGMENTS

(71) Applicant: Zscaler, Inc., San Jose, CA (US)

(72) Inventors: Chenhui Hu, Boston, MA (US); Shikhar Omar, Bangalore (IN)

(73) Assignee: Zscaler, Inc., San Jose, CA (US)

( * ) Notice: Subject to any disclaimer, the term of this patent is extended or adjusted under 35 U.S.C. 154(b) by 51 days.

(21) Appl. No.: 18/918,429

(22) Filed: Oct. 17, 2024

(65) Prior Publication Data

US 2026/0067353 A1 Mar. 5, 2026

(30) Foreign Application Priority Data

Sep. 2, 2024 (IN) ............................ 202441066173

(51) Int. Cl.

*G06F 15/16* (2006.01)
*G06F 8/70* (2018.01)
*G06F 40/20* (2020.01)
*H04L 9/40* (2022.01)
*H04L 43/067* (2022.01)
*H04L 67/10* (2022.01)

(52) U.S. Cl.

CPC ................ *H04L 67/10* (2013.01); *G06F 8/70* (2013.01); *G06F 40/20* (2020.01); *H04L 43/067* (2013.01); *H04L 63/104* (2013.01); *H04L 63/20* (2013.01)

(58) Field of Classification Search

CPC ............. H04L 67/10; G06F 40/20; G06F 8/70
See application file for complete search history.

(56) References Cited

U.S. PATENT DOCUMENTS

2015/0186495 A1* 7/2015 Abbas ................ G06F 16/3346 707/739
2023/0254318 A1* 8/2023 Hu ....................... G06F 21/604 726/1
2024/0205231 A1 6/2024 Bardhan et al.
2025/0123946 A1* 4/2025 Eberlein .............. G06F 11/302

* cited by examiner

*Primary Examiner* — Normin Abedin
(74) *Attorney, Agent, or Firm* — Baratta Law PLLC; Lawrence A. Baratta, Jr.; Ryan Odessa

(57) ABSTRACT

Systems and methods for generating SDLC-based application segments include defining a set of applications, the set of applications comprising a plurality of applications associated with a tenant of the cloud-based system; generating a plurality of application pairs from the set of applications; analyzing applications within each application pair of the plurality of application pairs for filtering the plurality of application pairs, the analyzing comprising a plurality of similarity checks and identification of environment key words; and generating one or more application segments each comprising one or more applications from the set of applications based on the filtering.

18 Claims, 20 Drawing Sheets

800

| | USER OVERLAP WITH GERMANY | USER OVERLAP WITH SINGAPORE | USER OVERLAP WITH NETHERLANDS | USER OVERLAP WITH UNITED STATES | USER OVERLAP WITH IRELAND | USER OVERLA P WITH JAPAN |
|---|---|---|---|---|---|---|
| GERMANY | 1 | 0 | 0.8205 | 0.9163 | 0.7933 | 0 |
| SINGAPORE | 0 | 1 | 0 | 0 | 0 | 0 |
| NETHERLANDS | 0.8205 | 0 | 1 | 0.0468 | 0.3654 | 0 |
| UNITED STATES | 0.9163 | 0 | 0.0468 | 1 | 0.4179 | 0.2105 |
| IRELAND | 0.7933 | 0 | 0.3654 | 0.4179 | 1 | 0 |
| JAPAN | 0 | 0 | 0 | 0.2105 | 0 | 1 |

FIG. 15

1900

| | | |
|---|---|---|
| Active Directory | RDP | Printer |
| FTP | Citrix | SMTP |
| SAP | Postgre SQL | Microsoft SQL |
| MySQL | Oracle Database | SSH |
| IBM Lotus Notes | Mongo Database | Nexpose |
| RabbitMQ | Rockwell Automation | SolidWorks |
| VMware | Microsoft Endpoint Configuration Manager | |

FIG. 19

GENERATING SOFTWARE DEVELOPMENT LIFE CYCLE (SDLC)-BASED APPLICATION SEGMENTS

FIELD OF THE DISCLOSURE

The present disclosure generally relates to computer networking systems and methods. More particularly, the present disclosure relates to generating Software Development Life Cycle (SDLC)-based application segments for tenants of a cloud-based system.

BACKGROUND OF THE DISCLOSURE

Enterprises are using more and more applications as users are remote and resources and applications are being hosted in the cloud. The traditional view of an enterprise network (i.e., corporate, private, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet and sensitive applications. Cloud-based security solutions described herein are adapted to autonomously generate application segment recommendations for tenants of a cloud-based systems. By leveraging well defined application segments, organizations can increase their security by reducing the attack surface associated with wildcard application policies.

BRIEF SUMMARY OF THE DISCLOSURE

In various embodiments, the present disclosure includes a method having steps, a system including at least one processor and memory with instructions that, when executed, cause the at least one processor to implement the steps, and a non-transitory computer-readable medium having instructions stored thereon for programming at least one processor to perform the steps. Systems and methods include defining a set of applications, the set of applications including a plurality of applications associated with a tenant of the cloud-based system; generating a plurality of application pairs from the set of applications; analyzing applications within each application pair of the plurality of application pairs for filtering the plurality of application pairs, the analyzing including a plurality of similarity checks and identification of environment key words; and generating one or more application segments each including one or more applications from the set of applications based on the filtering.

The steps can further include performing a first filtering of the plurality of application pairs based on a similarity of a domain prefix and suffix of the applications within each application pair; performing a second filtering of the plurality of application pairs based on a presence of an environment key word within domains of the applications within each application pair; performing a third filtering of the plurality of application pairs, the third filtering including removing any environment key words from application domains and filtering the plurality of application pairs based on a similarity of domains of the applications within each application pair after removal of environment key words; and generating one or more application segments based on any remaining application pairs. The first filtering can include only maintaining application pairs of the plurality of application pairs which contain applications who's suffixes are the same, and who's prefix similarity is above a threshold. The second filtering can include only maintaining application pairs of the plurality of application pairs which contain at least one application domain that includes an environment key word. The third filtering can include only maintaining application pairs of the plurality of application pairs which contain applications who's domain similarity score is above a threshold after any environment key words are removed. The set of applications can include applications that have not been included in any application segments for the tenant. The set of applications can include applications within a specific application segment. The steps can further include receiving a list of environment key words for performing the identification. The list of environment key words can include one or more environment key words each associated with a Software Development Life Cycle (SDLC) environment. Generating one or more application segments can include combining a plurality of application pairs.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a block diagram of a user device, which may be used with the cloud-based system or the like.

FIG. 15 is a diagram representing the relationship of application usage between a plurality of locations.

FIG. 19 is a table of example application types.

DETAILED DESCRIPTION OF THE DISCLOSURE

Again, the present disclosure relates to systems and methods for generating Software Development Life Cycle (SDLC)-based application segments for tenants of a cloud-based system. In various embodiments, methods include defining a set of applications, and generating pairs of applications from the set of applications. Various steps then include performing a plurality of filtering procedures for the pairs of applications to narrow down the set of applications. These filtering procedures include performing various similarity measurements of parts of application domains and identifying environment key words within application domains. Based on a final set of application pairs, SDLC-based application segments can be derived.

Example Cloud-Based System Architecture

Figure 1A:
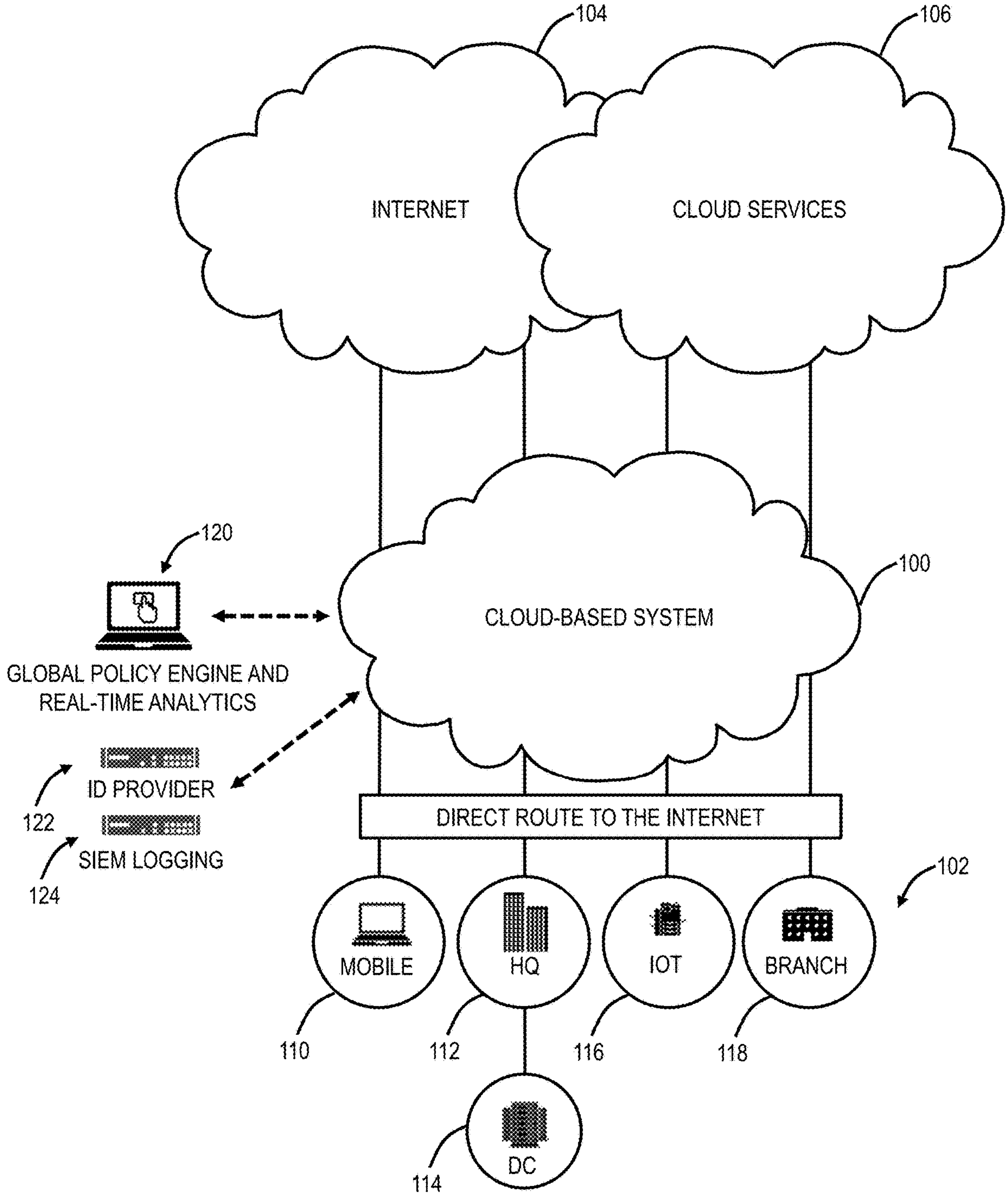
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various endpoints 102, as well as other cloud services. In this manner, the cloud-based system 100 is located between the endpoints 102 and the Internet as well as any cloud services 106 (or applications) accessed by the endpoints 102. As such, the cloud-based system 100 provides inline monitoring inspecting traffic between the endpoints 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the endpoints 102. As such, newly discovered threats can be promulgated throughout the cloud-based system 100 for all tenants practically instantaneously. The antivirus protection can include antivirus, antispyware, antimalware, etc. protection for the endpoints 102, using signatures sourced and constantly updated. The DNS security can identify and route command-and-control connections to threat detection engines for full content inspection.

The DLP can use standard and/or custom dictionaries to continuously monitor the endpoints 102, including compressed and/or SSL-encrypted traffic. Again, being in a cloud implementation, the cloud-based system 100 can scale this monitoring with near-zero latency on the endpoints 102. The cloud application security can include CASB functionality to discover and control user access to known and unknown cloud services 106. The file type controls enable true file type control by the user, location, destination, etc. to determine which files are allowed or not.

Figure 5:
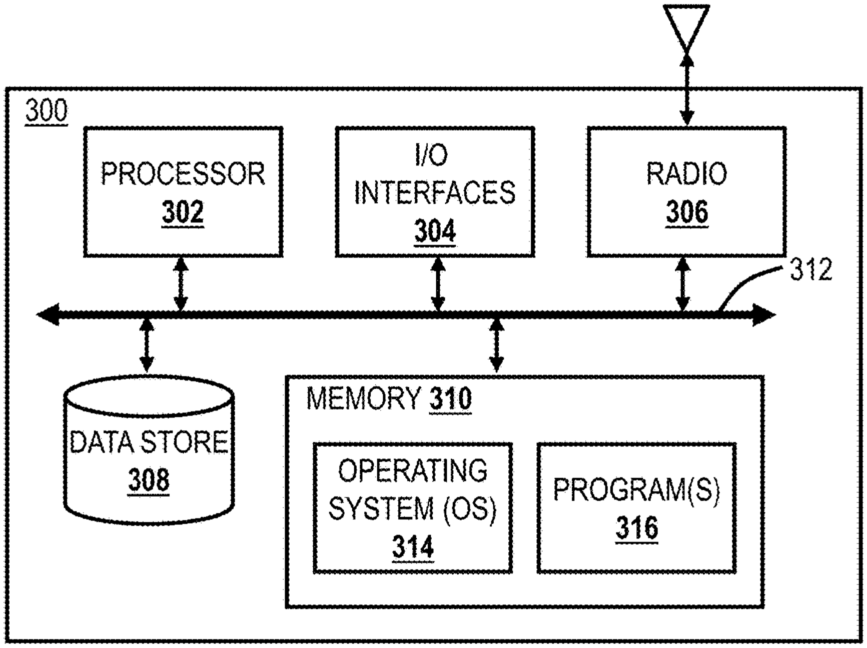

For illustration purposes, the endpoints 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example computing device 300 is illustrated in FIG. 5). The devices 110, 116, and the locations 112, 114, 118 are shown for illustrative purposes, and those skilled in the art will recognize there are various access scenarios and other endpoints 102 for the cloud-based system 100, all of which are contemplated herein. The endpoints 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. In various embodiments, an endpoint 102 can be contemplated as a user using a computing device 300. Those skilled in the art will recognize a user contemplated as an endpoint 102 has to use a corresponding computing device 300 for accessing the cloud-based system 100 and the like, and the description herein may use the endpoint 102 and/or the computing device 300 interchangeably.

Further, the cloud-based system 100 can be multi-tenant, with each tenant having its own endpoints 102 and configuration, policy, rules, etc. One advantage of the multi-tenancy and a large volume of users is the zero-day protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the endpoints 102, as well as independent of platform, operating system, network access technique, network access provider, etc.

There are various techniques to forward traffic between the endpoints 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the endpoints 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the endpoints 102 and to a Security Information and Event Management (SIEM) system 124 for event logging. The system 124 can provide alert and activity logs on a per-endpoint 102 basis.

Zero Trust

Figure 1B:
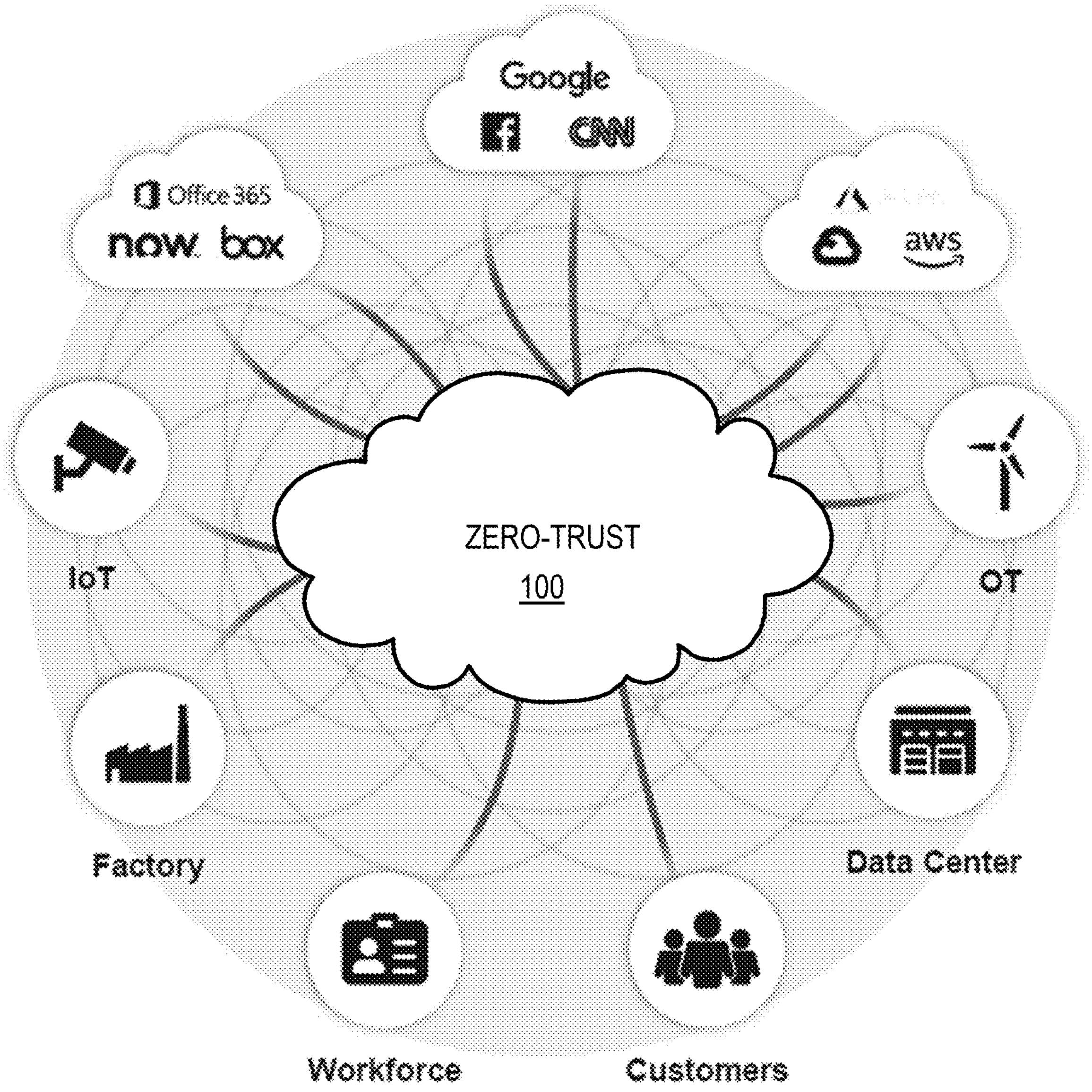
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multifactor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
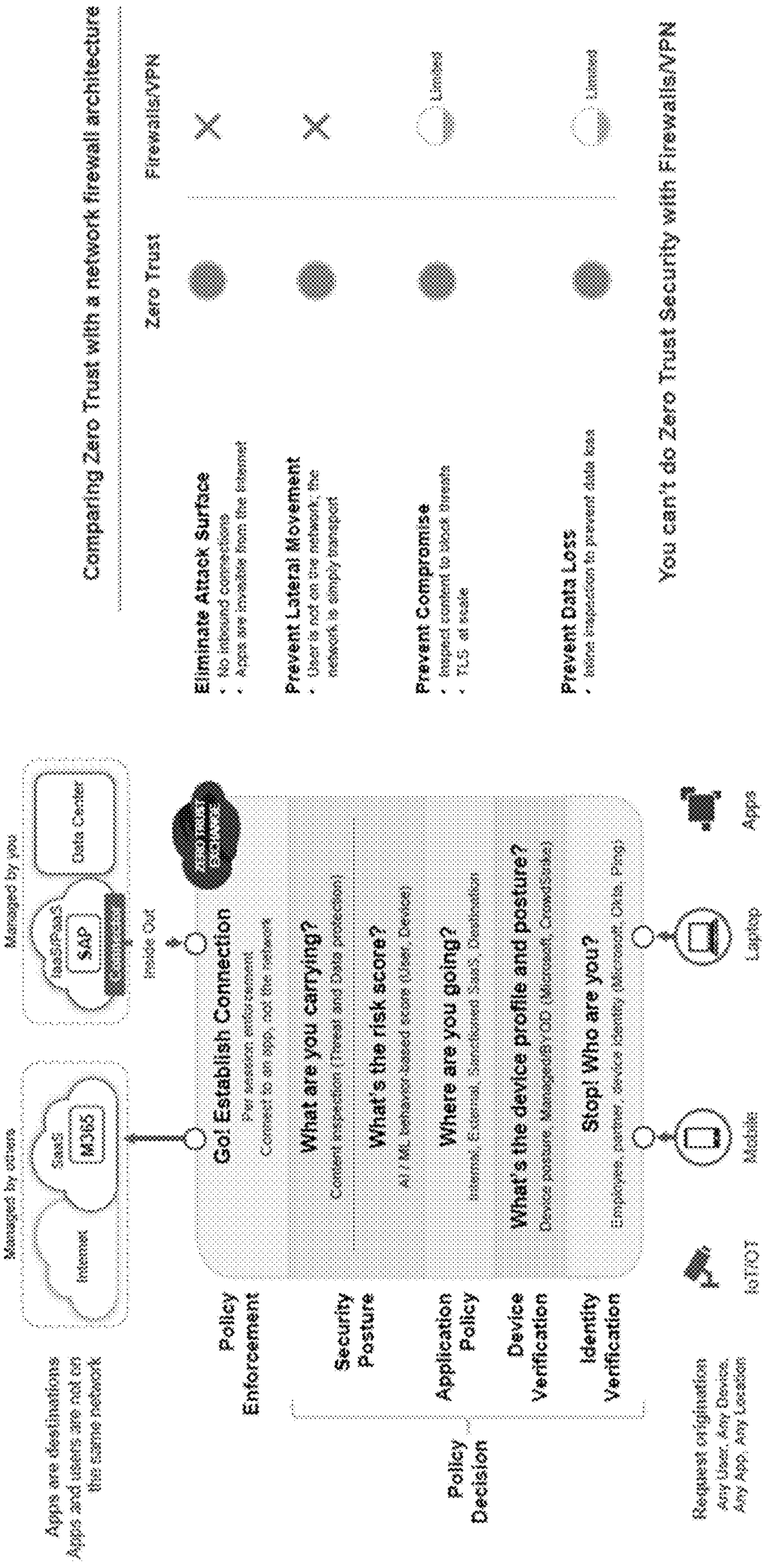
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the endpoint 102 location. Unlike the conventional firewall-based approach, this eliminates attack surfaces, there are no inbound connections; prevents lateral movement, the user is not on the network;

prevents compromise, allowing encrypted inspection; and prevents data loss with inline inspection.

Example Implementation of the Cloud-Based System

Figure 2:
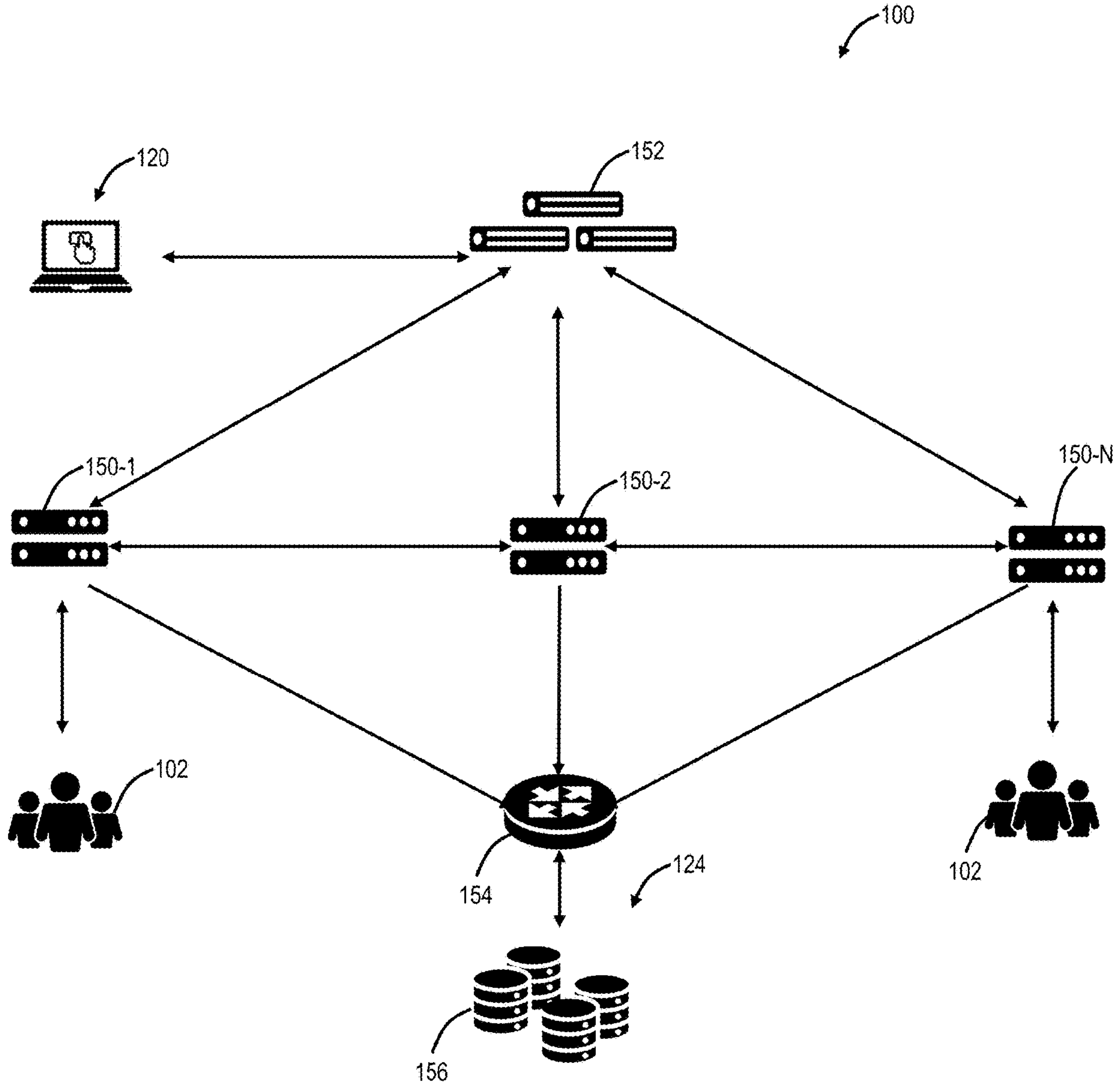
FIG. 2 is a network diagram of an example implementation of the cloud-based system.
Figure 4:
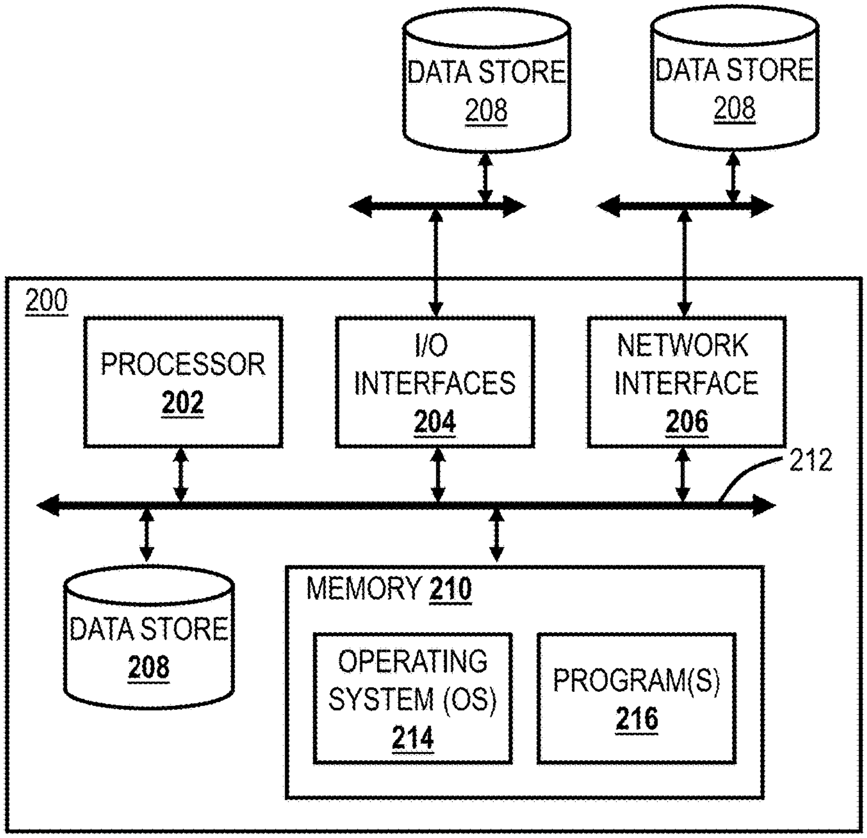
FIG. 4 is a block diagram of a server, which may be used in the cloud-based system, in other systems, or standalone.

FIG. 2 is a network diagram of an example implementation of the cloud-based system 100. In an embodiment, the cloud-based system 100 includes a plurality of nodes (EN) 150, labeled as nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the nodes 150. The central authority 152 provides centralized policy, real-time threat updates, etc. and coordinates the distribution of this data between the nodes 150. The nodes 150 provide an onramp to the endpoints 102 and are configured to execute policy, based on the central authority 152, for each endpoint 102. The nodes 150 can be geographically distributed, and the policy for each endpoint 102 follows that endpoint 102 as he or she connects to the nearest (or other criteria) node 150.

Of note, the cloud-based system 100 is an external system meaning it is separate from tenant's private networks (enterprise networks) as well as from networks associated with the devices 110, 116, and locations 112, 118. Also, of note, the present disclosure describes a private node 150P that is both part of the cloud-based system 100 and part of a private network. Further, the term nodes as used herein with respect to the cloud-based system 100 (including enforcement nodes, service edge nodes, etc.) can be one or more servers, including physical servers, virtual machines (VM) executed on physical hardware, appliances, custom hardware, compute resources, clusters, etc., as described above, i.e., the nodes 150 contemplate any physical implementation of computer resources. In some embodiments, the nodes 150 can be Secure Web Gateways (SWGs), proxies, Secure Access Service Edge (SASE), etc.

The nodes 150 are full-featured secure internet gateways that provide integrated internet security. They inspect all web traffic bi-directionally for malware and enforce security, compliance, and firewall policies, as described herein, as well as various additional functionality. In an embodiment, each node 150 has two main modules for inspecting traffic and applying policies: a web module and a firewall module. The nodes 150 are deployed around the world and can handle hundreds of thousands of concurrent users with millions of concurrent sessions. Because of this, regardless of where the endpoints 102 are, they can access the Internet 104 from any device, and the nodes 150 protect the traffic and apply corporate policies. The nodes 150 can implement various inspection engines therein, and optionally, send sandboxing to another system. The nodes 150 include significant fault tolerance capabilities, such as deployment in active-active mode to ensure availability and redundancy as well as continuous monitoring.

In an embodiment, customer traffic is not passed to any other component within the cloud-based system 100, and the nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the nodes 150. In another embodiment, specific data specified by each tenant, e.g., only email, only executable files, etc., is processed through one of the nodes 150.

Each of the nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the node 150 may allow the distribution of the content item, preclude distribution of the content item, allow distribution of the content item after a cleaning process, or perform threat detection on the content item. In an embodiment, the actions taken by one of the nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The nodes 150 establish persistent connections to the central authority 152 to download all policy configurations. When a new user connects to an node 150, a policy request is sent to the central authority 152 through this connection. The central authority 152 then calculates the policies that apply to that endpoint 102 and sends the policy to the node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the nodes 150 request the new policy when the endpoint 102 next makes a request. In an embodiment, the node 150 exchange "heartbeats" periodically, so all nodes 150 are informed when there is a policy change. Any node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Computing Device Application for Traffic Forwarding and Monitoring

Figure 3:
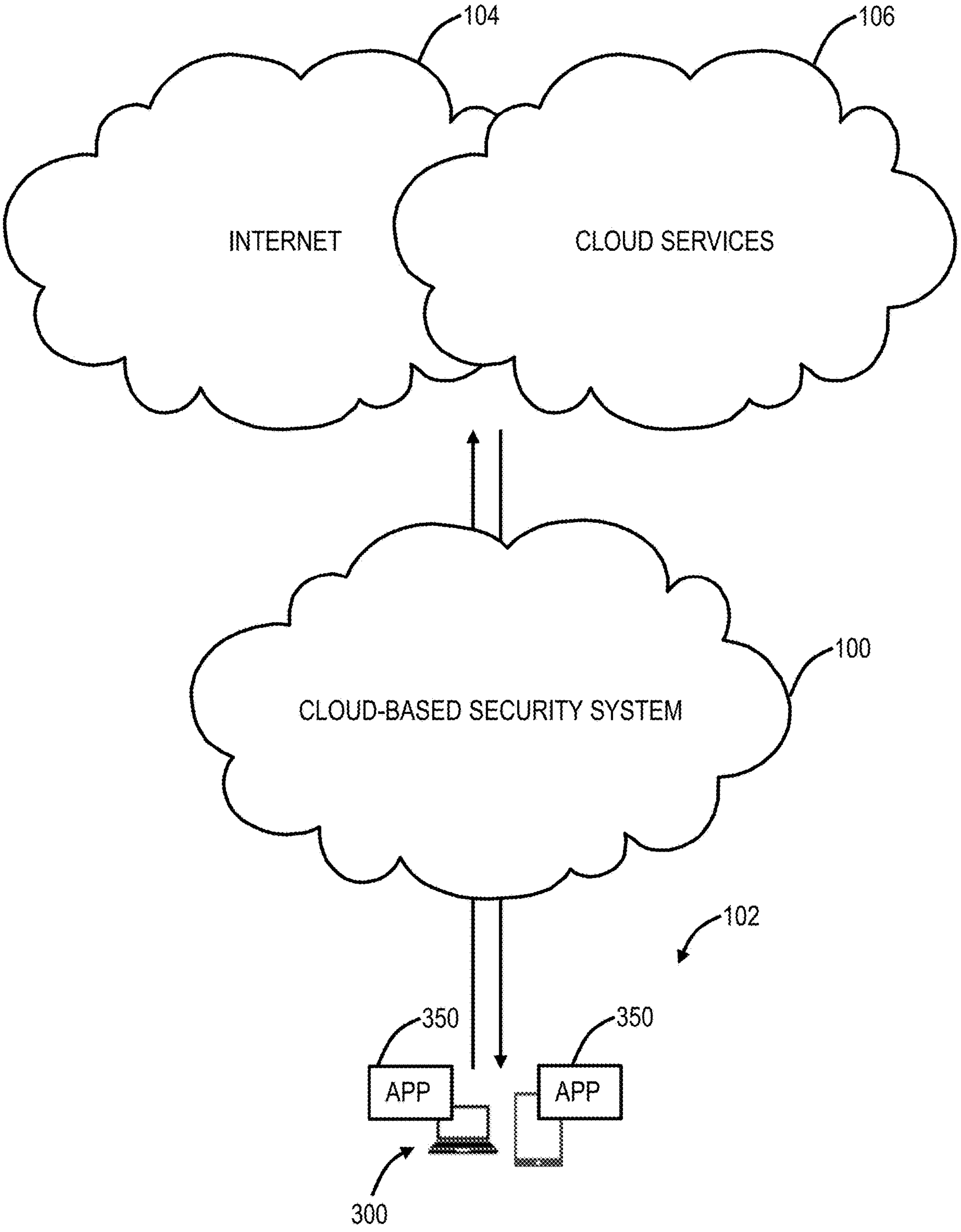
FIG. 3 is a network diagram of the cloud-based system illustrating an application on the user devices with users configured to operate through the cloud-based system.

FIG. 3 is a network diagram of the cloud-based system 100 illustrating an application 350 on computing devices 300 with endpoints 102 configured to operate through the cloud-based system 100. Different types of computing devices 300 are proliferating, including Bring Your Own Device (BYOD) as well as IT-managed devices. The conventional approach for a computing device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if an endpoint 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit node 150. Further, the application 350 can detect trusted networks, allowed applications, etc. and support secure network access. The application 350 can also support the enrollment of the computing device 300 prior to accessing applications. The application 350 can uniquely detect the endpoints 102 based on fingerprinting the computing device 300, using criteria like device model, platform, operating system, etc. The application 350 can support Mobile Device Management (MDM) functions, allowing IT personnel to deploy and manage the computing devices 300 seamlessly. This can also include the automatic installation of client and SSL certificates during enrollment. Finally, the application 350 provides visibility into device and app usage of the endpoint 102 of the computing device 300.

The application 350 supports a secure, lightweight tunnel between the computing device 300 and the cloud-based system 100. For example, the lightweight tunnel can be HTTP-based. With the application 350, there is no requirement for PAC files, an IPsec VPN, authentication cookies, or endpoint 102 setup.

Example Server Architecture

FIG. 4 is a block diagram of a server 200, which may be used in the cloud-based system 100, in other systems, or standalone. For example, the nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example Computing Device Architecture

FIG. 5 is a block diagram of a computing device 300, which may be used with the cloud-based system 100 or the like. Specifically, the computing device 300 can form a device used by one of the endpoints 102, and this may include common devices such as laptops, smartphones, tablets, netbooks, personal digital assistants, MP3 players, cell phones, e-book readers, IoT devices, servers, desktops, printers, televisions, streaming media devices, and the like. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the computing device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

Figure 6:
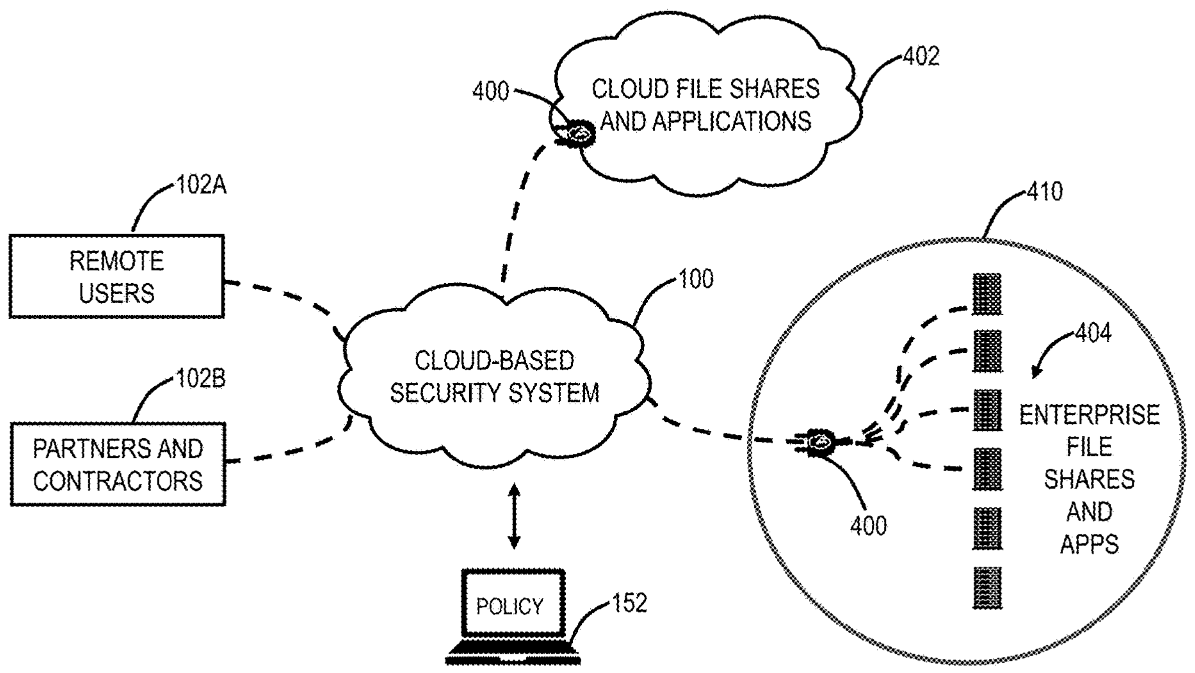
FIG. 6 is a network diagram of a Zero Trust Network Access (ZTNA) application utilizing the cloud-based system.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., endpoints 102A, 102B) that are remote and an on-premises connector 400 that is either located in cloud file shares and applications 402 and/or in an enterprise network 410 that includes enterprise file shares and applications 404. As described herein, an application segment is a grouping of defined applications 402, 404, based upon access type or user privileges.

The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the computing device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the computing device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant-if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

ZPA is an example cloud service that provides seamless, zero trust access to private applications running on the public cloud, within the data center, within an enterprise network, etc. As described herein, ZPA is referred to as zero trust access to private applications or simply a zero-trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps). As described herein, the term private applications (or simply applications) is used to any secure application offered to users associated with an enterprise. The private applications can be cloud-hosted, offered via a ZTNA service, hosted within an enterprise network, and the like. Also, the private applications can be exposed to all users such as while within the well-defined perimeter.

Zero-Trust Policy Using Machine Learning

Again, the conventional approach for access to the applications 402, 404 is manual, i.e., each endpoint 102 is given permission. This worked fine when there were a small set of applications, but the number of applications 402, 404 increases significantly. As such, it has been observed that enterprises simply apply wildcard rules for application 402, 404 access. A wildcard rule grants coarse-grain access such as everyone in the company, everyone in a certain group, everyone in a certain location, etc. Thus, while zero-trust provides the best security profile, the advantage is lost because of the wildcard access, i.e., the attack surface is expanded due to the wildcard access.

To solve this problem, the present disclosure contemplates using machine learning to observe application access and to make policy recommendations. In particular, the present disclosure provides a policy recommendation where the policy is defined as which user group can access the applications 402, 404.

Figure 7:
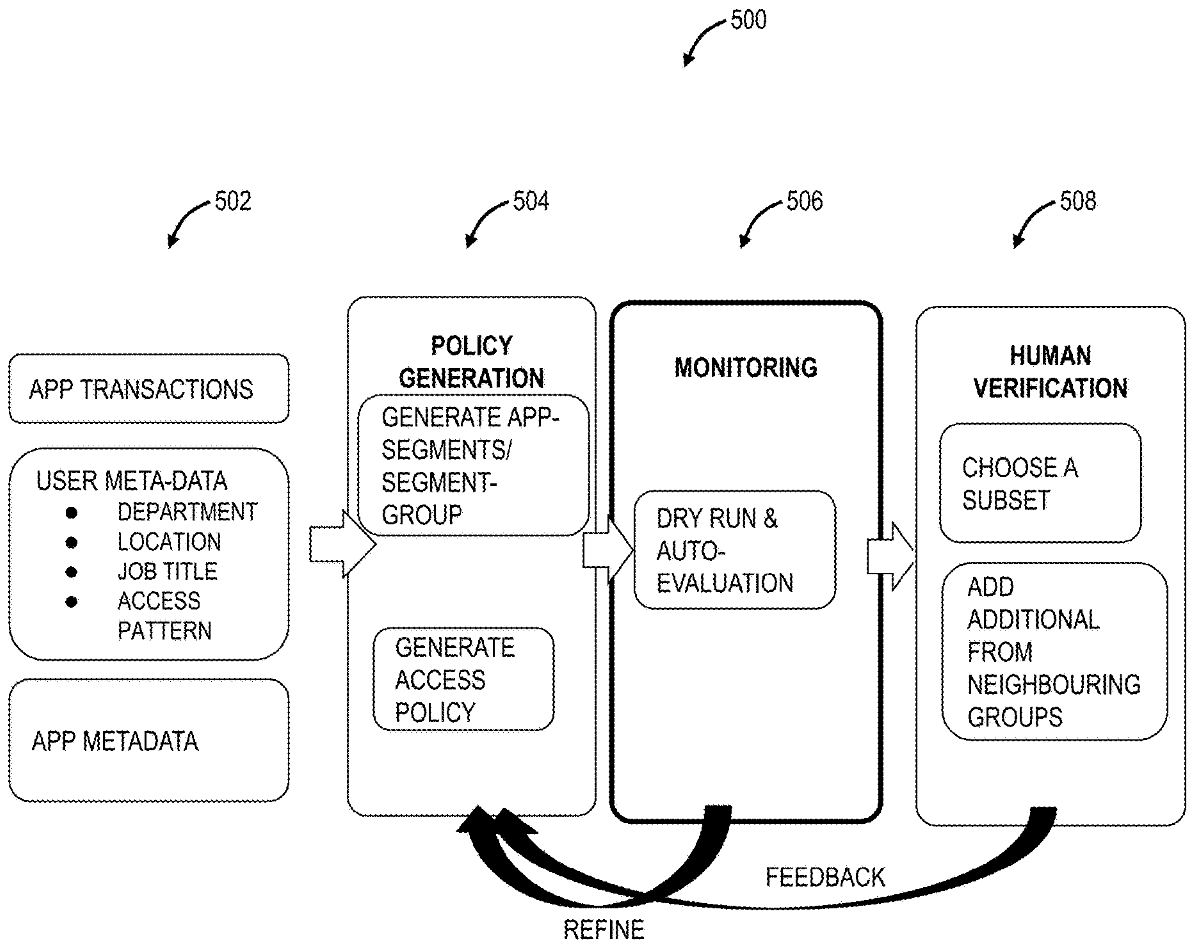
FIG. 7 is a flow diagram of a process for automatic policy recommendations for private application access.

FIG. 7 is a flow diagram of a process 500 for automatic policy recommendations for private application access. Specifically, the process 500 illustrates the workflow for automatic policy recommendations for which includes a data gathering stage 502, a policy generation stage 504, a monitoring stage 506, and a verification stage 508. The data gathering stage 502 includes obtaining data from application transactions and the data includes user meta-data and app meta-data. Here, monitoring is performed to see who (the endpoints 102) accesses the applications 402, 404. Note, the monitoring can be via the cloud-based system 100, the app connectors 400, logs from the applications 402, 404, etc. The applications 402, 404 can be initially configured with wildcard settings, e.g., all endpoints 102 of a company. The monitoring includes analyzing who, when, how long, etc. access the applications 402, 404. The user meta-data describes the endpoints 102 including their department, location, job title, etc. Also, the user meta-data can include the endpoint 102 access pattern, again monitored via the cloud-based system 100.

The data from the data gathering stage 502 is used by the policy generation stage 504 to automatically generate a policy. Again, as described herein, a policy includes user group X can access segment group Y with port Z, where segment group Y includes an app-segment that is a group of applications (or domains). The policy generation stage 504 utilizes machine learning as described herein. The machine learning is configured to generate app-segments, namely which applications (or domains) should be grouped, and user groups, namely which users should be grouped, and access policy, namely which user groups should be provided access to which app-segments. Note, a segment group contains a set of app-segments. In the case where a segment group contains one single app-segment, the term app-segments and segment groups are used here interchangeably.

The monitoring stage 506 is used to refine the policy generation stage 504. Specifically, the present disclosure ensures the policy recommendations are high quality, with little IT admin overhead. Finally, the verification stage 508 is used to finalize the policy recommendations and can include human intervention to choose subsets of the policy, add users, etc., and any verification is also fed back to the policy generation stage 504.

Of note, the stages 502, 504, 506, 508 can be performed in collaboration with one another. For example, the more data gathered in the data gathering stage 502, the more detail the policy generation stage 504 has to generate policies. Also, the more monitoring and verification, the more feedback is provided to the policy generation stage 504.

In an embodiment, the policy generation stage 504 can operate similar to recommendation systems, e.g., via streaming services. This suggests content for users and includes various approaches with collaborative filtering, deep neural nets, etc. However, a key difference here is the user tolerance level for quality. Content obviously is less important than application access. As such, the stages 506, 508 focus on quality and confidence in the recommended policy.

Example Data Input

Again, the data gathering stage 502 provides data for usage of the applications 402, 404 for the policy generation stage 504. Also, the data gathering stage 502 monitors usage when there are loose access restrictions on the applications 402, 404, such as wildcard rules. The monitoring can be via the cloud-based system 100, via logs of the applications 402, 404, via the app connectors 400, and combinations thereof.

The following table illustrates some example monitored data.

| app | Userid | num_active_days |
|---|---|---|
| Application 1 | user 1 | 10 |
| Application 1 | user 2 | 15 |
| Application 2 | user 2 | 1 |
| Application 2 | user 3 | 19 |
| Application 3 | user 2 | 2 |
| Application 3 | user 3 | 18 |
| Application 4 | user 1 | 9 |
| Application 4 | user 3 | 11 |

The table above can be converted to provide feature vectors. Here, the feature vectors for applications 2 and 3 are more similar, thus a ML model could suggest grouping them together in an app-segment or segment group.

| | user 1 | user 2 | user 3 | . . . |
|---|---|---|---|---|
| Application 1 | 10 | 15 | 0 | . . . |
| Application 2 | 0 | 1 | 19 | . . . |
| Application 3 | 0 | 2 | 18 | |
| Application 4 | 9 | 0 | 11 | . . . |

Graphs

Figure 8:
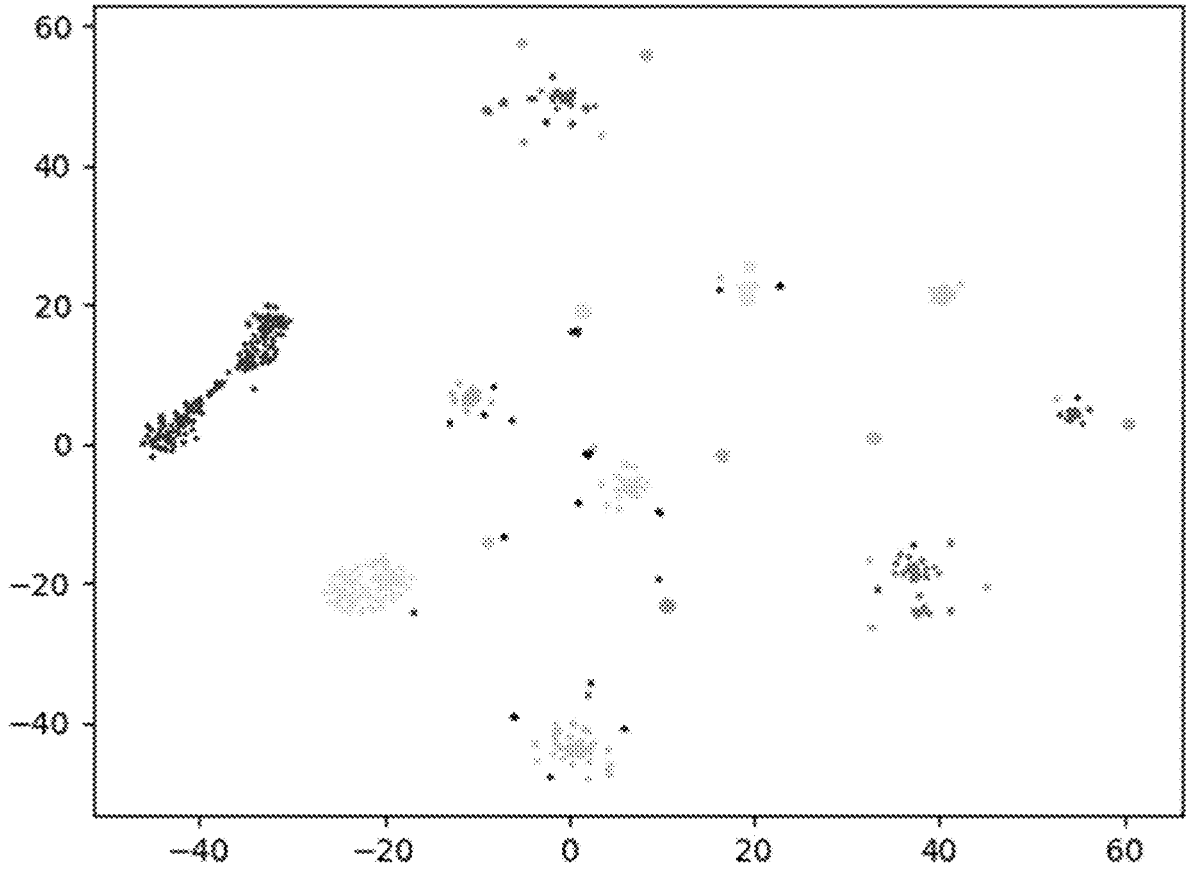
FIG. 8 is a graph of app-segments.
Figure 9:
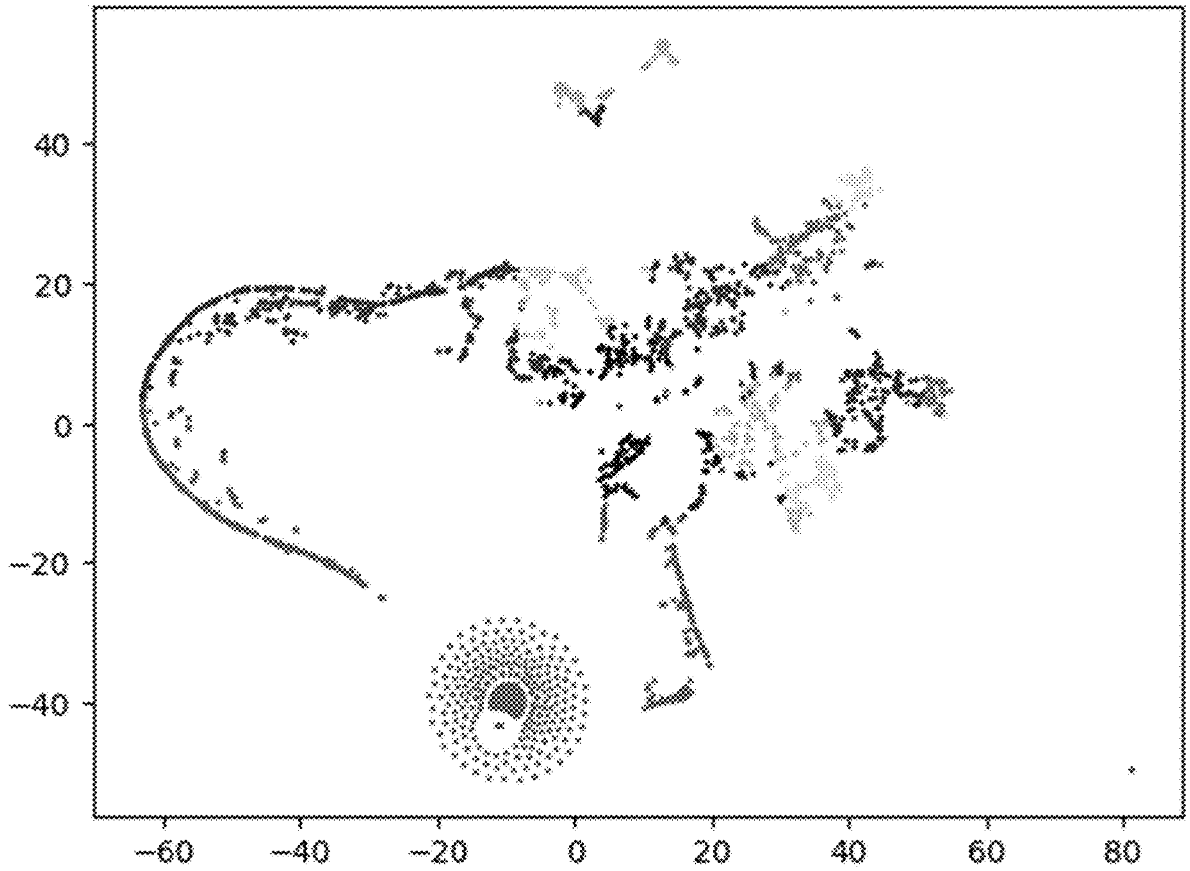
FIG. 9 is a graph of user groups.
Figure 10:
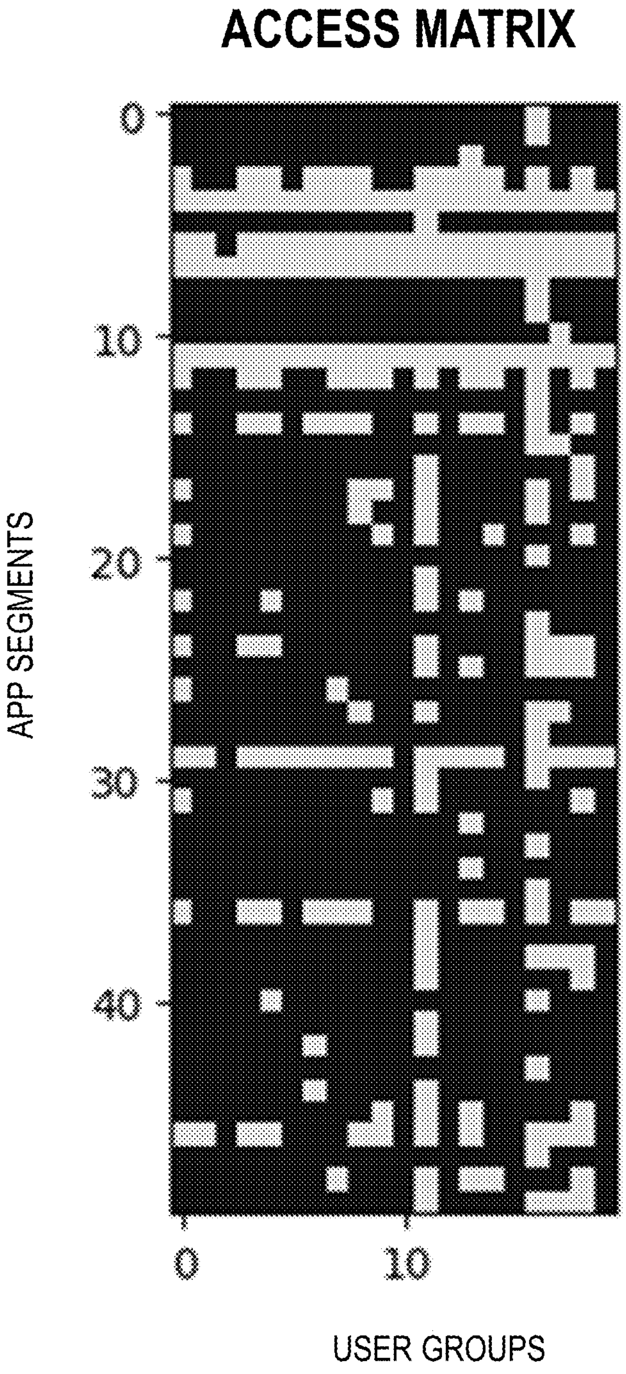
FIG. 10 is an access matrix between app-segments and user groups.

The feature vectors can be used to generate app-segments and user groups, and to form an access matrix. FIG. 8 is a graph of app-segments, FIG. 9 is a graph of user groups, and FIG. 10 is an access matrix between app-segments and user groups. Of note, each dot is an application with the same application having the same shading.

Results

Figure 11:
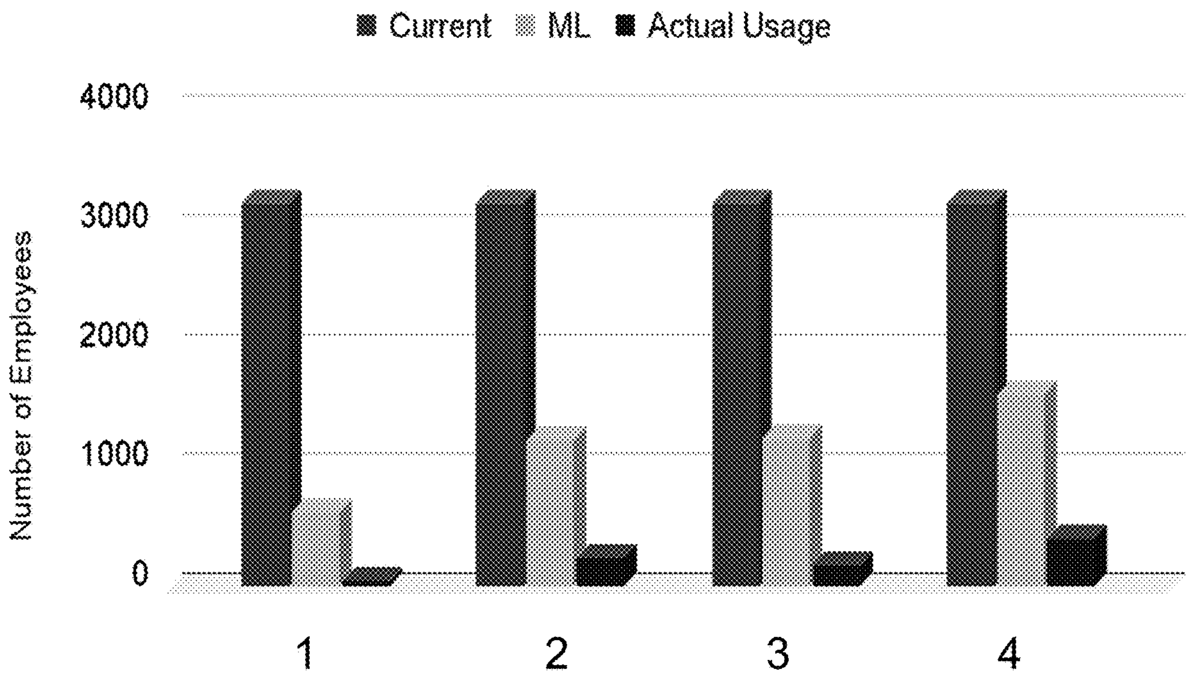
FIG. 11 is a graph of results of the process recommending policy for four example applications.

FIG. 11 is a graph of results of the process 500 recommending policy for four example applications. This illustrates the benefits of using an ML model for policy recommendation. Specifically, FIG. 11 shows the attack surface reduction which results from the tighter access policy suggested by ML. The first bar, labeled "current," is the existing attack surface where all users have access to these four applications. For example, the company can have 3000+ users and the wildcard rule allows access to all users in the current approach. The next bar, labeled "ML," shows what our model suggests, effectively reducing the attack surface by more than 50%. Although the ML suggested access policy has tightened the access control significantly, there is still a gap between the actual user usage and the ML suggestion.

In fact, it is advantageous for this gap to be non-zero, because not all user-app interactions are observed in the training data, thus the ML model needs to generalize from the training data so that it can predict whether to allow or block an unseen user-app interaction. For example, if user 1 was on vacation and did not access application #4 in the past few weeks, yet other user group members do, user 1 should still be allowed access, The generalization ability of the ML model impacts the usability of the product. If a ML model does not generalize well, then some users who should have had access would be blocked, thus incurs tickets for IT admins. To ensure the ML model does not result in disruption to the production environment, we do dry run using past data before deployment. Specifically, the most recent one month data is reserved as test data (of course, this can be other values such as 1- or 2-week data), and then uses the model to predict if user app transactions in the test data should be allowed or blocked, and this gives us a way to simulate and monitor our generated policy before deployment Use Case—Existing Customers For a company already using the ZTNA service for the applications 402, 404, the process 500 is akin to assigning a new category. Also, this existing customer already has data for app-segments and user groups for existing applications 402, 404. The input here can be log data from the ZTNA service, existing user groups, and newly discovered applications 402, 404. The goal here is to provide policy recommendation to either the existing applications 402, 404 (e.g., where there is wildcard access) and/or the newly discovered applications 402, 404.

The output here is a mapping of the newly discovered applications 402, 404 to either existing app-segments or to new app-segment. The policy generation stage 504 can use machine learning techniques such as a similarity metric based on cosine. There is no need for clustering given the majority of clusters exist.

For the input data, this can include the user or user-group's traffic pattern. Each element is the usage for each group. The usage could be the number of transactions or the number of active usage days. Additional transformation like log or Term Frequency—Inverse Document Frequency (TF-IDF) transformation could be applied. The input data can also use the port traffic pattern, leveraging domain knowledge. For example, port "139" and "445" could be grouped together, thus assigning the same port_tag (for normalization purpose), which allows better generalization. There can also be heuristic based on ports, e.g., domains whose traffic mainly went through 3389 are RDP applications. Other data can include hostnames, geolocation, etc. For example, app-segments can be separated in each geographic region. An organization's network addressing structure could also be leveraged as domain knowledge. For example, two apps in the same subnets (e.g., both in 10.36.0.1/24) or in the consecutive IP subnets (e.g. in 10.36.0.1/24 and 10.36.0.2/24 respectively) are more likely to be in the same app-segment compared to those in the subnets "further away" from each other (e.g., 10.36.0.3/24 and 10.36.200.3/24 respectively).

There is a question on how to decide when an existing app-segment is not similar enough, thus needing a new app-segment. This can be solved using a distance threshold based on the customer feedback.

Use Case—New Customers

With new customers, there are no existing app-segments or user groups. There is a requirement to monitor usage over time to get log data, such as with wildcard access. The output includes user groups and mapping from the applications 402, 404 to app-segments. The policy generation stage 504 can use k-means clustering or DBSCAN clustering (Density-based spatial clustering of applications with noise (DBSCAN)) machine learning techniques.

Here, the log data is analyzed using clustering to generate user-groups which are then leveraged to generate app-grouping (app-segments). Imagine the case of X*Y=Z, where you observe Z, while needing to hypothesize X and Y, where X is user-grouping, while Y is app-grouping. Fixing X helps hypothesizing Y, since there is one less moving piece.

Figure 12:
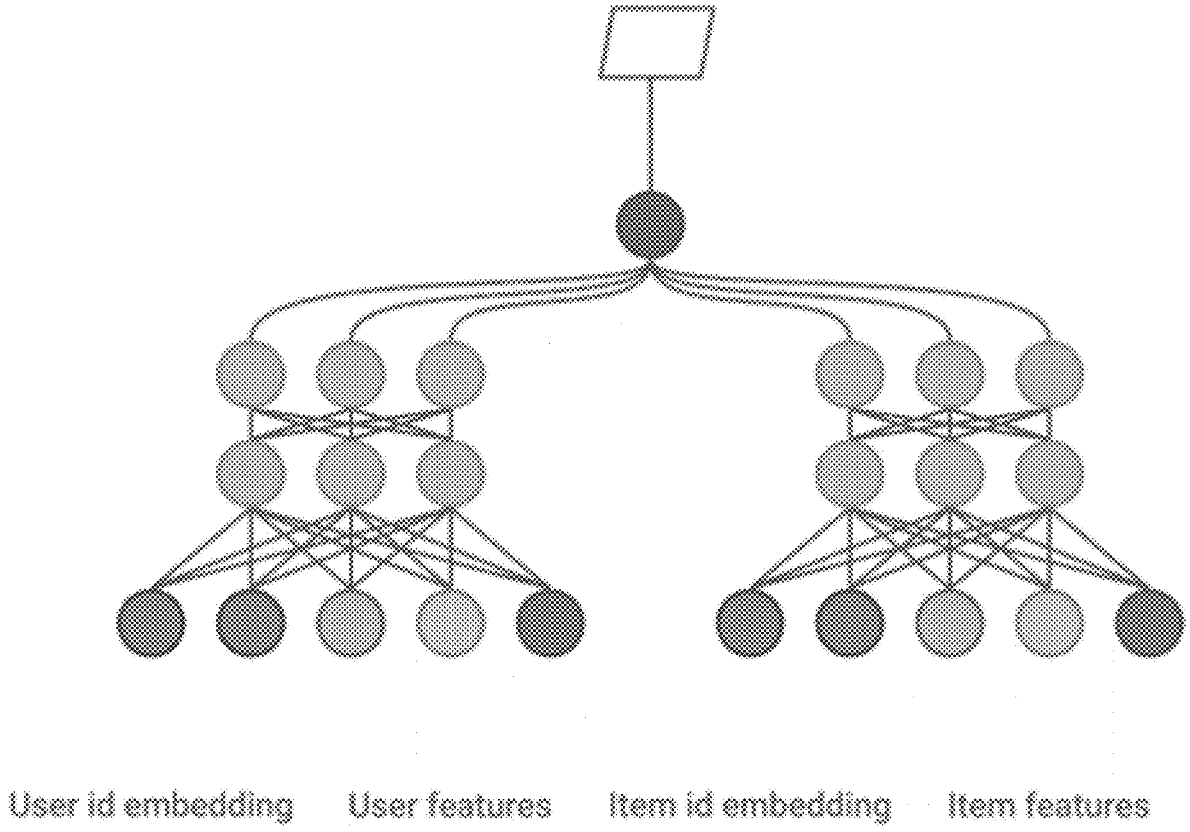
FIG. 12 is a two-tower neural network that can be used to generate a machine learning model with various features.

Alternatively, it is possible to use collaborative filtering or word-embedding type of recommendation to generate both user-grouping and app-grouping from the log data. FIG. 12 illustrates a tree that can be used to generate a machine learning model with various features. Here, the user job title, user locations, user app usage pattern, domain names, port usage pattern, organizations' network addressing structure, etc. can be used as features to generate both user-grouping and app-grouping from the log data. FIG. 12 is from blog.tensorflow.org/2020/09/introducing-tensorflow-recommenders.html, the contents of which are incorporated by reference herein.

It is also possible to leverage the log data from the cloud-based system 100 to help user-grouping: SaaS access pattern. Each element is the usage for SaaS applications 402, 404, such as Salesforce or Amazon Web Services. The usage could be the number of transactions or the number of active usage days. Additional transformation like log transformation could be applied. Translate from existing policy (from other vendors) as a starting point. Better than wildcard matching.

Metrics

The metrics include 1) how good is the machine learning-generated policy and 2) how much impact does this automation have. For 1), the metrics include endpoints 102 who used to have access with the previous wildcard policy that are now being denied. This could be positive, e.g., engineers having access to Customer Relationship Management (CRM) apps that they have no need for. This can be measured by the number of tickets raised for denied access. Another metric can include people who were banned due to the existing non-wildcard policy that now have access. If no policy exists for new customers, then the goal would be reducing the access surface (the tighter the access control the better). Percentage of reduction of the user access, e.g., attack surface reduction, is another metric for the effectiveness of the tighter access policy generated by ML. For 2), the metrics are reduction in customer onboarding time, support time, and IT operations efforts.

Machine Learning

Our model can speed up the configuration process for a zero-trust policy by assisting in all three stages during configuration. Below are the three stages during the configuration process.

1) Define segmentation-group, where each segmentation-group could consist of a few app-segments. An app-segment includes a set of apps, where each app is characterized by domain/IP address, port, protocol.
2) Define user-groups, where each user-group consists of a list of users.
3) Define Access Policy, which specifies which user-groups should be allowed to access a segmentation-group or an app-segment.

ML Models for Stages 1 and 2

Again, the problem is similar to content recommendation problem, though that is user-to-content while we have user-to-app. Specifically, the concept of app-segment is similar to the movie category/genre, which groups a set of similar movies together.

There are different paradigms, we mainly consider the following three paradigms and ensemble the results from different models.

Paradigm 1: Generate the Grouping of Apps Using the Existing User-Grouping

This is only applicable to the case when the user-groups are provided by ZTNA customers. For example, department information or job title or the company reporting chain (manager information). Feature vectors for apps: access pattern for user-groups (e.g., departments). Each app is characterized by the user-groups who access it and the corresponding frequency. Specifically, each column in a feature vector is a value corresponding to a user-group, where the value could be the number of transactions, the number of active days, or the percentile of the usage.

Feature compression: due to the curse of dimensionality, the raw features are too sparse to generate good grouping/clustering results. Therefore, we consider the following two additional steps to process the raw features.

i) Normalization: we consider using one of the following types of normalization. Log_transform; min-max-scaler; standard-scaler; TF-IDF.
ii) Dimensionality reduction using UMAP (Uniform Manifold Approximation and Projection for Dimension Reduction) or Autoencoder.

We use clustering approaches (as detailed below) to group the apps based on their compressed feature vectors.

Paradigm 2: Generate the Grouping of Apps and Users Sequentially

Feature vectors for apps: access pattern for users. Each app is characterized by the users who access it and the corresponding frequency. Specifically, each column in a feature vector is a value corresponding to a user, where the value could be the number of transactions, the number of active days, or the percentile of the usage. The tables in the Example Data Input section are an example of feature vectors. There might be noise in the input, thus we could consider cleaning up input by applying a certain threshold to remove infrequent user-app pairs.

This is similar to that in Paradigm 1, except the user-grouping is unknown yet, thus it is characterized by each user's access pattern, instead each user-group's access pattern The remaining feature compression and clustering is similar to that in paradigm 1.

Grouping users: Feature vectors for users: access pattern of apps. Each user is characterized by the apps they have accessed. For example, users access engineering related apps, such as, code base or database, more often than other users are more likely to be engineers. If the app-segments have been generated from the earlier step, we can replace the apps with app-segments to help the model generalize better, since it reduces the sparsity of feature vectors. The remaining feature compression and clustering is similar to the above—Note that grouping apps (stage 1) and group users (stage 2) are interchangeable in order. This means we could generate users-grouping first and then leverage the results of user-grouping to group apps.

In addition, there could be multiple iterations of sequential optimization. For example, group apps first, then leverage the results of app-grouping to group users, then further leverage the new user-grouping to re-generate the app-grouping. This iterative process (sequential optimization) could continue until the results become stable (little change with more iterations).

Paradigm 3: ML-Learn the Feature Representation of Apps and Users *Jointly*

An embedding is a feature representation of an item (e.g., an app or a user). It is shorter than the raw feature and can be treated as a compressed version of the raw features. Collaborative filtering (CF) is a traditional way to learn feature representation of both apps and users together. Specifically, it does Singular Vector Decomposition over an app-user co-occurrence matrix.

However, CF cannot take in additional features like user meta-data and app meta-data. Therefore, we consider two-tower neural networks like those in tensorflow_recommender, such as, Yi, Xinyang, Ji Yang, Lichan Hong, Derek Zhiyuan Cheng, Lukasz Heldt, Aditee Kumthekar, Zhe Zhao, Li Wei, and Ed Chi. "Sampling-bias-corrected neural modeling for large corpus item recommendations." In Proceedings of the 13th ACM Conference on Recommender Systems, pp. 269-277. 2019, the contents of which are incorporated by reference herein.

FIG. 12 is an example architecture of the neural network, where the item corresponds to the app. User features (user meta-data) include (but not restricted to): User location, job title, Department, Manager, Behavior pattern machine-learned from data sources other than the ZTNA. For example, we could leverage data from the cloud-based system 100 to further enrich the feature vectors for users.

App features (app meta-data) include (but not restricted to): port and protocol usage pattern; the computer process that initiated the connection to the application; similarity based on domain names; an organization's network addressing structure; app location.

For example, "abc0123.company.com" and "abd0124.company.com" are similar to each other. In the case where there is no FQDN, but only IP addresses, the IP addresses in the same subset indicates that the two apps could be similar. For example, 131.24.10.70 are in the same subnet with 131.24.10.81 with mask 24. App location: hosted on servers within the same subsets or data centers Note that the above app features could be input features for stand-alone models, which could be used for model ensemble later. Apart from learning the representation for users and apps together, paradigm 3 also has the advantage of predicting unseen user-app interactions. This means we could apply the learned model to fill in user-app interactions not observed during the training time period, while potentially appearing in the future (during test or deploying phase)

Ensemble of a Set of Different Models

For the items remaining in the same group throughout different models, they are associated with high confidence scores and presented to the users on the top. We keep the different parts among different models as alternatives and the alternatives are ranked by the confidence level.

The advantage of ensemble includes (1) provide the confidence score over the recommended grouping (2) provide informative alternatives. The ensemble could be in parallel, as well as sequentially. Specifically, we could present the different clustering results as alternatives, while we could also stitch the model sequentially, so that one clustering is applied on top of the earlier clustering like that in hierarchical clustering.

Note that the results of apps-grouping could be segment-group or app-segments. We did not differentiate the two in the section about app-grouping: it could be either-way. If it is considered as a segment-group, each app-group can be further decomposed into smaller groups corresponding to app-segments. The further decomposition could be based on functionality of the apps, which could be hypothesized from the port/protocol usage and the computer process that initiates the connection or the server-group information.

Clustering Approaches

Clustering is an unsupervised learning technique. We considered the following clustering approaches:

K-means clustering. We can use the elbow method to auto-select the number of clusters.

DBScan

Hierarchical DBScan

Graph-based community detection algorithm

Stage 3: Define Access Policy

After obtaining the segmentation-group/app-segments and user-groups from stage 1 and stage 2, we can define the access policy. For a segmentation-group or an app-segments, 1) we remove user-groups who never access those app-segments
2) For the remaining user groups who have shown the usage in the log data, we ranked the user-groups by the percentage of users who access the segmentation-group (with respect to the total number of users in the user group).
3) We present all of those user-groups to the customer and suggest access-deny for those user-groups where the percentage of usage is lower than a threshold. The reason we still keep those as options is to give customers a chance to verify in case that there is a real need.

Sequential Pattern of Application Access

In addition to the various techniques described herein, it was determined that leveraging sequential patterns of application access is shown to significantly improve application segmentation metrics. As described herein, a sequential pattern means that a particular endpoint 102 accesses a plurality of applications 402, 404 in a given time period. For example, engineers may access software design tools (e.g., source code repository such as bitbucket) and product tracking tools (e.g., Jira) together. Salespeople may access customer relationship management (CRM) tools and inventory management tools together. That is, the role of the endpoint 102 and the similarity between the applications can be derived accurately by noticing and detecting these patterns.

Of note, the present disclosure automates application access for users based on monitoring user activity and recognizing that there are sequential patterns of application access. Leveraging sequential patterns of application access is shown to significantly improve application segmentation metrics. Experiments show leveraging the sequential patterns of application access significantly improve app segmentation metrics based on some example companies that were evaluated.

As described herein, a sequential patterns of application access includes some sequence of application access over some period of time. For example, an endpoint 102 accesses application A, then application B, means the endpoint 102 is likely going to access application C as well. Thus, the sequence of A+B+C can be used to give the endpoint 102 access to the application C.

Figure 13:
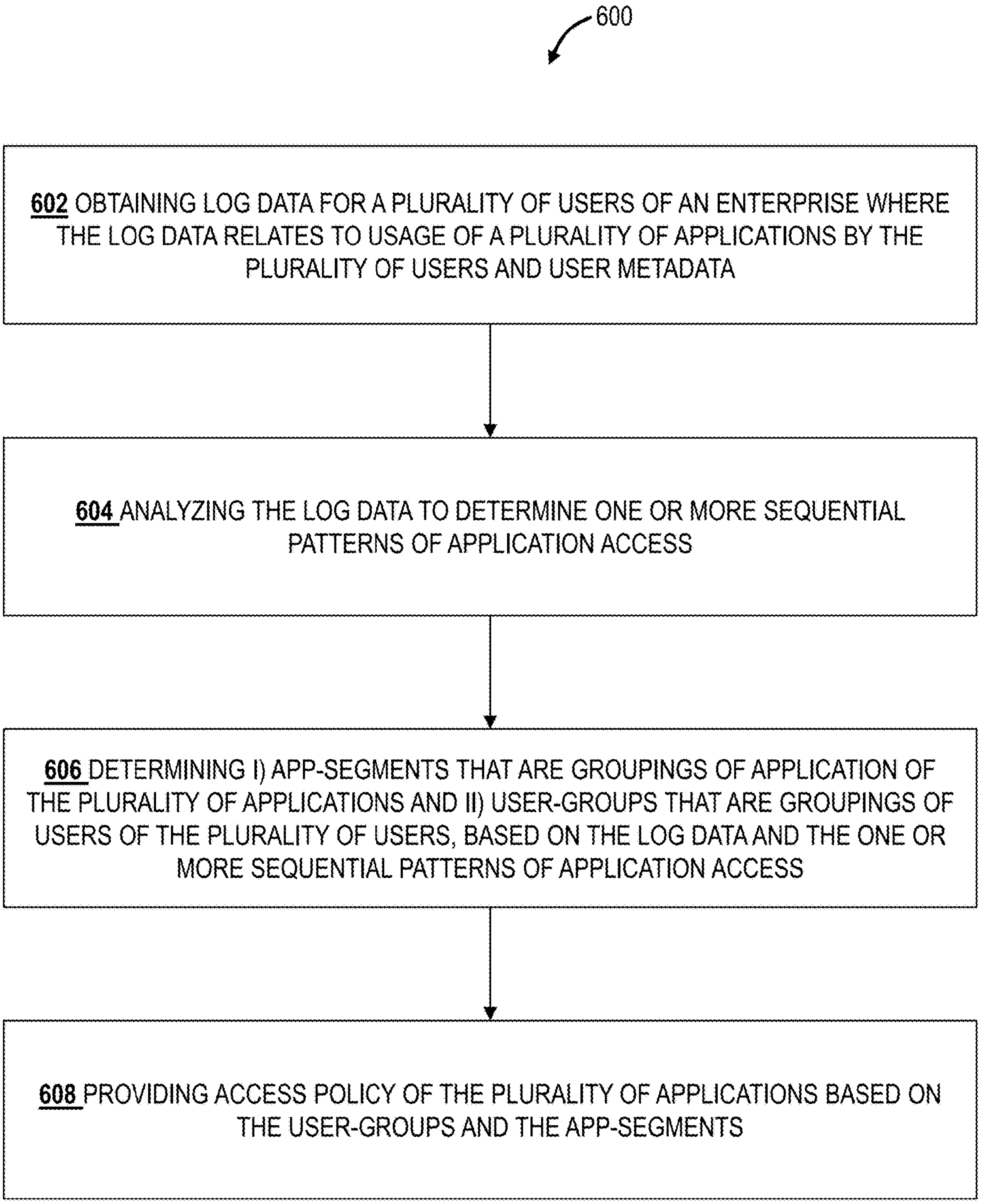
FIG. 13 is a flowchart of a process for generating zero-trust policy for application access based on sequence-based application segmentation.

FIG. 13 is a flowchart of a process 600 for generating zero-trust policy for application access based on sequence-based application segmentation. The process 600 contemplates implementation as a method with steps, via a processor configured to implement the steps, via the cloud-based system 100 configured to implement the steps, via the server 200 configured to implement the steps, and via a non-transitory computer-readable storage medium having computer readable code stored thereon for programming at least one processor to perform the steps.

The process 600 includes obtaining log data for a plurality of users of an enterprise where the log data relates to usage of a plurality of applications by the plurality of users and user metadata (step 602); analyzing the log data to determine one or more sequential patterns of application access (step 604); determining i) app-segments that are groupings of application of the plurality of applications and ii) user-groups that are groupings of users of the plurality of users, based on the log data (including user metadata) and the one or more sequential patterns of application access (step 606); and providing access policy of the plurality of applications based on the user-groups and the app-segments (step 608). The one or more sequential patterns of application access include a sequence of accessing a plurality of applications in a given time period.

The process 600 can further include monitoring the access policy over time based on ongoing log data, manual verification of the access policy, and incidents where users are prevented from accessing any application; and adjusting any of the determined app-segments and the user-groups, based on the monitoring. The usage of the plurality of applications by the plurality of users can be via wildcard rules allowing a large subset of users to access the plurality of applications. The access policy of the plurality of applications can have less access than via the wildcard rules.

The log data can be transformed to feature vectors, and wherein the determining includes clustering with the feature vectors. The log data can be obtained over a period of time and the determining and providing is performed over the period of time until the access policy meets a quality threshold. The enterprise can be an existing customer of a cloud service and the access policy is for one of existing applications and new applications, and wherein the determining is based on a similarity metric with existing user-groups. The enterprise can be a new customer of a cloud service, and wherein the determining is based on clustering to determine the user-groups and the app-segments. The user-groups are fixed to determine the app-segments.

The access policy can include which user-group can access which app-segments on which ports. The determining can be via a machine learning model that uses features including any of port and protocol usage pattern; the computer process that initiated the connection to the application; similarity based on domain names; an organization's network addressing structure; app location; user location; job title; department; manager; and behavior patterns. The machine learning model can include an ensemble of different models.

CMDB-Based Application Segmentation

In addition to the various techniques described herein, the present disclosure provides systems and methods for leveraging Configuration Management Database (CMDB) data for recommending application segments. The various embodiments described herein describe systems which are adapted to identify applications that are present in an enterprise/customers CMDB. The systems can then identify those applications within transactional data (log data) as described in previous sections of the disclosure. The systems can identify, based on the transactional data monitored inline, information such as ports, numbers of transactions, numbers of users accessing specific applications, and the like. The systems can then recommend application segments based on the information within transactional data and information that CMDB data already contains. A CMDB is a known term for a database used by enterprises for storing information relating to hardware and software assets of the enterprise. More particularly, the present disclosure is focused on application information stored in the CMDB.

It will be appreciated that the present systems and methods leveraging Configuration Management Database (CMDB) data for recommending application segments can be utilized in combination with any of the application segmentation methods described herein to recommend application segments.

As an example, if there are 10 applications within the CMDB data, and these 10 applications belong to a particular application group, the present systems will match those 10 applications in the transactional data and produce segmentation recommendations. That is, the systems look at ports used to access those applications, the number of users that access those applications, protocol usage, etc. The segmentation recommendations produced by the present systems can be provided to users via a portal. Users can then accept such recommendations or choose to ignore the recommendations.

Referring to the example described above, in a particular use case, an enterprise may have, for example, 20 different ports open for a particular application. The present systems, while monitoring over a period of time, may detect that instead of 20 ports, users are only seen accessing this particular application via only 5 ports. Based on this, the systems can recommend blocking the other 15 ports that are not used and only keep open the 5 ports that are used in order to reduce the attack surface of the enterprise network.

In another example, if there are 100 applications within the CMDB data, and these 100 applications belong to 10 different application groups, the present systems will try to match as many of the 100 applications in the transactional data and produce segmentation recommendations based on application groups of the matched applications.

The monitoring of transactional data can be ongoing, and the serving of recommendations can be configured to occur at predetermined time intervals. For example, the serving of segmentation recommendations can be set to occur at a monthly interval, thus, the recommendations can be based on a months' worth of transactional data. it will be appreciated that these time intervals can be any length of time such as a day, a week, and the like.

Again, the present disclosure provides various processes which can be combined to generate application segments and application segment policies. Various embodiments leverage customers CMDB data to generate application segments based on the service name/application name of applications present in CMDB. This helps customers in the segmentation of their important applications and configurations.

The CMDB data leveraged by the present systems can include service names and business application names of the applications, and at least one of the FQDN or IP address of the applications. As described, transactional data is utilized, for example, transaction data monitored from the last 30 days for a customer. Two major components of the described process for utilizing CMDB data for application segmentation include (1) matching CMDB applications to correct applications in transactional data and (2) generating one or more segmentation reports (application segments) from the matched CMDB applications.

Matching CMDB applications to correct applications in the transactional data involves matching applications present in CMDB data to applications present in transactional data using their FQDN and IP information. This process is performed by applying multiple techniques sequentially in order of confidence in the matching quality they provide. At each step, a technique is applied resulting in the matching of a subset of CMDB applications while the remaining unmatched ones are tried in the next step. This process continues until all the techniques available have been exhausted.

In various embodiments, the process of matching CMDB applications in transactional data can include matching using direct name, matching IPs in the CMDB data, matching based on Fully Qualified Domain Name (FQDN) prefix, matching using 1-1 mapping between FQDN-IP for applications, and matching using FQDN to IP mapping. For example, if there is a domain of abc. 123.com in the CMDB, the systems must identify which domain it matches with in the transactional data. This process involves matching applications present in CMDB data to applications present in transactional data using FQDN and IP information.

These various techniques are required because CMDB data can be improperly structured, include noise, and names of domains can be improperly written or exported. The example of abc. 123.com is an example of a properly written/logged domain. In this case, the systems can perform a direct search in the transactional data, and if the systems find the exact domain of abc. 123.com in the transactional data, it can be determined that it is the same domain/ application. Although, as stated, CMDB data can include improperly entered or exported data. For example, an entry in the CMDB can include only a prefix such as "abc" and not include a full domain of abc. 123.com. In such cases, the systems perform a search for "abc" within the transactional data. Based on there being no other particular domains/ applications with the string of "abc" being included therein, the systems determine that any domain including "abc" in the transactional data, such as abc. 123.com, are a match to the CMDB entry of "abc".

Alternatively, if there are a plurality of domains in the transactional data with include the string of "abc", another technique will be required. For example, if within the transactional data there are domains abc. 123.com and abc. 1234.com, one or more of the other techniques can be used to remove the ambiguity. Again, these techniques include utilizing FQDN and IP information.

For the technique of matching directly using FQDNs in both of the data, i.e., the CMDB data and the transactional data, the matching process starts with this technique which takes all of the FQDNs in the CMDB data and checks their exact presence in the FQDNs from transactional data. Applications matched this way have the highest confidence in terms of correctness. The remaining FQDNs and IP apps are matched through techniques listed below in the descending order of confidence.

The next technique includes matching IP apps present in CMDB using app-server IP mapping from transactional data. This technique tries to match the IP addresses of IP apps present in the CMDB data with the IP addresses in the mapping from the transactional data. The mapping is searched for IP addresses of IP apps in CMDB data and If a match is found, it assigns the corresponding application name from the mapping to the matched IP address of the IP app from the CMDB data.

The next technique includes matching based on the FQDN prefix. For the applications in CMDB where only the prefix is provided for the applications (e.g. "confluence" for confluence.abc.com), this technique checks if there is a corresponding application in transactional data with the same prefix and exactly one suffix (e.g. there is only one suffix for "confluence" that is "abc.com" and not multiple such as "abc.com", "abc.net", etc.). If so, it assigns the application name from transactional data to the matched application in the CMDB data.

The next technique includes matching using 1-1 mapping between FQDN-IP for apps in both the data. In this step, a 1-to-1 mapping is created between applications and their IP addresses for both the data, CMDB, and transactional. Only those applications are eligible in the mapping which are accessed through a single IP address and that IP address is also being used to access that particular application only. The goal is to create a unique identity for the application using their IP address from both data. Using these 1-to-1 mappings, applications from CMDB and transactional data are matched where the IP address is the same for both. For example:

CMDB data: app.customer.abc.com 10.19.234.10
Transactional data: app.abc.com 10.19.234.10
app.customer.abc.com is matched to app.abc.com.

The next technique includes matching FQDN in CMDB using app-server IP mappings from transactional data. In this last technique, all the remaining unmatched applications in the CMDB data are attempted to match through their IP addresses by searching them in app-server IP mappings from transactional data. If a match is found, the application corresponding to the IP address from the app-server IP mapping is matched to CMDB applications. After this step, any remaining CMDB applications are tagged as unmatched in the resulting data frame.

Overall, the functions described herein play a crucial role in establishing connections between the applications in the CMDB data and the applications in transactional data based on various matching criteria. As output, it returns a data frame containing the matched applications along with the match type (technique used) and a flag indicating if a match was found or not.

Once CMDB applications are matched to applications in transactional data, a segmentation report is generated which groups CMDB applications for each service name/business application name based on whether they are explicitly configured as an app segment or not. The report also contains more information regarding transaction volume and port-protocol usage for these applications.

As described, the present systems can be configured to focus on applications which the enterprise has not segmented for any reason, i.e., applications with wildcard rules. These applications may not be known to an enterprise, or the enterprise may not know how to segment these applications, Thus, the present systems utilize valuable insight, via the transactional data, to determine and recommend how these wildcard applications should be segmented in order to reduce a customer's attack surface.

In the segmentation report, each application can be grouped together based on whether they are explicitly configured as private access application segments or not. The report can contain information regarding transaction volume and port-protocol usage. The report can also contain information presented in a table format. i.e., report columns. This information can include proposed application segment names, FQDNs already explicitly configured in private access application segments, and new/non-configured FQDNs part of wildcards, i.e., FQDNs/applications with wildcard rules applied. Further, the information can include CMDB hostnames matched with FQDNs already explicitly configured in private access application segments, CMDB hostnames with no matching traffic found, CMDB hostnames matched with new/non-configured FQDNs part of wildcards, number of transactions for configured FQDNs, number of transactions for non-configured FQDNs, port ranges in use, and port-protocols in use.

The present steps for CMDB-based application segmentation can be combined with any of the application segmentation processes described herein to generate application segments more accurately. That is, the other processes for application segmentation can be contemplated as additional techniques for matching/grouping applications into segments.

Process for CMDB-Based Application Segmentation

Figure 14:
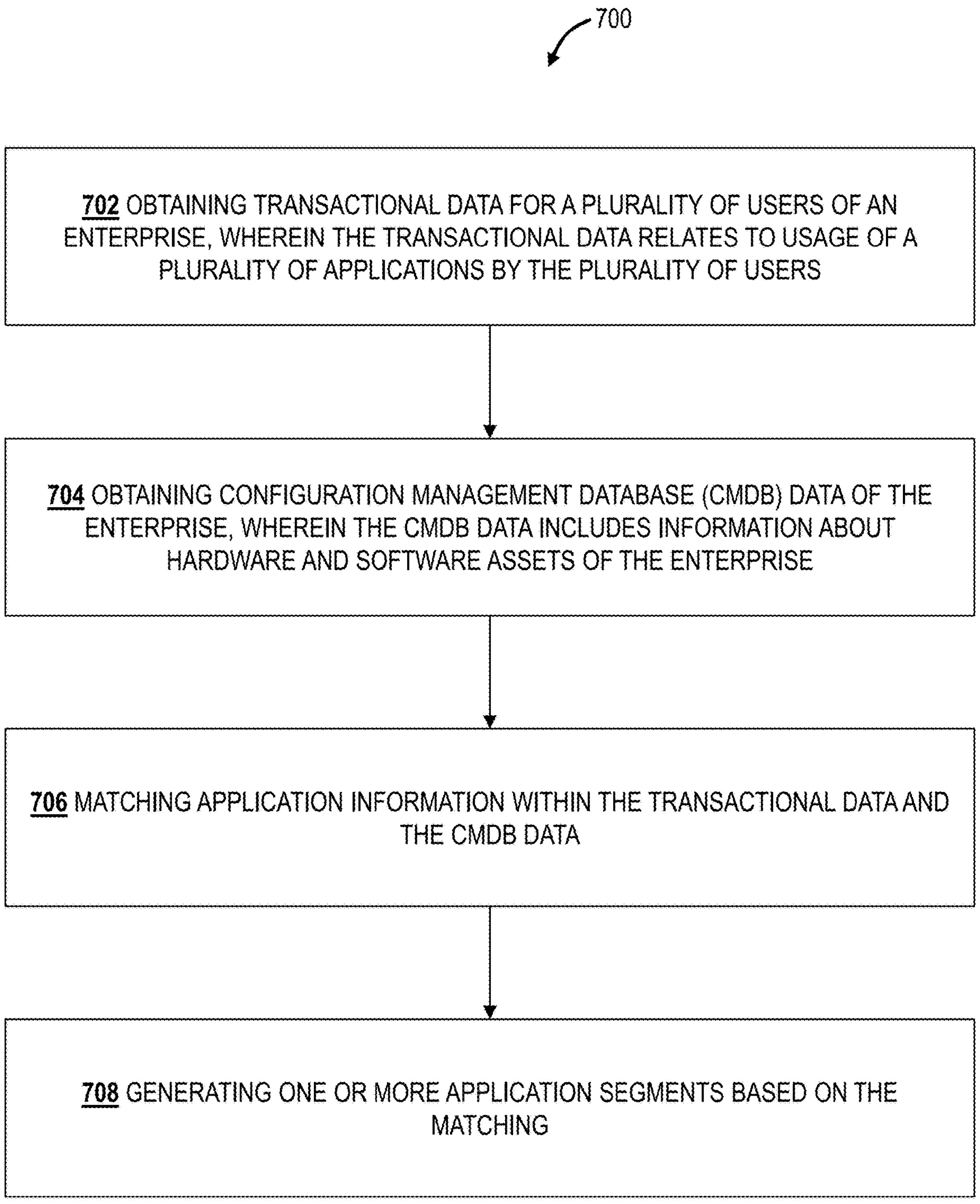
FIG. 14 is a flowchart of a process for CMDB-based application segmentation.

FIG. 14 is a flowchart of a process 700 for CMDB-based application segmentation. The process 700 includes obtaining transactional data for a plurality of users of an enterprise, wherein the transactional data relates to usage of a plurality of applications by the plurality of users (step 702); obtaining Configuration Management Database (CMDB) data of the enterprise, wherein the CMDB data includes information about hardware and software assets of the enterprise (step 704); matching application information within the transactional data and the CMDB data (step 706); and generating one or more application segments based on the matching (step 708).

The process 700 can further include providing access policy of the plurality of applications based on the one or more application segments. The matching can include performing a plurality of matching techniques between the transactional data and the CMDB data. The plurality of matching techniques can be performed in an order based on a confidence of each of the plurality of matching techniques. One of the plurality of matching techniques can include matching directly using Fully Qualified Domain Names (FQDNs) in both the transactional data and the CMDB data. One of the plurality of matching techniques can include matching application Internet Protocol (IP) addresses present in the CMDB data using app-server IP mappings from the transactional data. One of the plurality of matching techniques can include matching based on Fully Qualified Domain Name (FQDN) prefixes. One of the plurality of matching techniques can include matching using a 1-to-1 mapping between Fully Qualified Domain Name (FQDN) and Internet Protocol (IP) addresses for applications in transactional data and the CMDB data. One of the plurality of matching techniques can include matching Fully Qualified Domain Names (FQDNs) in the CMDB data using app-server Internet Protocol (IP) address mappings from the transactional data. The steps can further include generating a segmentation report; and providing the segmentation report to users of the enterprise.

Location-Based Application Segmentation

The present disclosure provides various embodiments for creating application segments and enforcing user policies based thereon. More particularly, the present disclosure provides systems and methods for determining application segments, and applications to include therein. The subsequent sections further provide systems and methods for determining and enriching application segment recommendations based on location information of users and applications. Based on analysis of user generated enterprise application segments, it was determined that location is an important factor for organizations when creating application segments for their users. That is, in many application segments manually created by enterprise administrators, location information was detected within their designations. For example, a large portion of application segments include a location within their labels, such as "Asia pacific apps" and the like. This implies that organizations desire application segments that are more location dependent.

The present cloud-based system 100 is adapted to collect information related to applications and users. More particularly, in various embodiments, the present cloud-based system 100 collects location related data associated with applications and users. For example, this data can include, but is not limited to, a nearest data center location from a point of use of an application, public IP address location of applications, public IP address location of users, etc. By utilizing such location data, the present systems can determine the locations of applications and the users who access these applications. The transactional data described herein can also be leveraged for determining usage patterns of applications and the like.

In various embodiments, the present systems and methods can include, prior to employing the present location-based application segmentation enhancements, determining a requirement to do so. This includes determining, for an enterprise (customer of the cloud-based system), application usage overlaps for a plurality of locations in which users of the enterprise reside. FIG. 15 is a diagram representing the relationship of application usage between a plurality of locations. This distribution 800 can be built based on established application segments. That is, the distribution can include application usage data of applications within an application segment. Thus, the distribution shown in FIG. 15 can provide insight as to what locations are actually using the applications within the segment, and how the attack surface can be greatly reduced by further narrowing the application segment based on location information. In various embodiments, users are divided based on their location, the systems then monitor how many users in one location use applications that are used by users in another location. For example, the number of users in the Netherlands which use applications used by users in Germany is observed to have an overlap of 0.8205. This observation can provide the conclusion that similar applications are being used within these locations and the overlap is high due to both locations being in Europe. This also leads to the conclusion that applications used by users of different regions are different and have much less overlap. For example, the overlap of Germany and Singapore is 0. Thus, users in specific locations tend to use specific applications only.

As described, the following processes for enhancing application segments based on location information can be performed based on such observations. For example, for an application segment, if it is observed that all locations associated with the application segment have high overlap, it can be concluded that further narrowing of the application segment is not necessary. Alternatively, if overlap of locations associated with the application segment is variable, as shown in FIG. 15, the present location-based application segmentation enhancements can be utilized. That is, the present location-based application segmentation can be performed on a per-segment basis and/or used in the initial application segmentation determination processes described herein.

By utilizing the present location-based application segmentation enhancements, various application segments that include large numbers of applications can be further narrowed. This can result in much tighter policy, and less risk for malicious lateral movement within an enterprise environment. Various methods for creating application segments utilize different factors. These factors can include features of applications and users such as domain name similarity. That is, in order to group two applications together, their domain name similarity score must be above a threshold. For example, the domain name similarity score must be above 80 for grouping to occur. By utilizing location data, the thresholds associated with such factors can be altered based on location information associated with applications and their users. In the example described above referencing domain name similarity, the original threshold may be 80, where two applications must have a domain name similarity score above 80 to be segmented together. This can be altered based on location information to cause the determination to be location-based. For example, the threshold can be raised or lowered based on the location relationship of the two applications in question.

In an embodiment, if two applications are from the same large location, then the threshold can be kept the same. Additionally, if the two applications are from the same sparse location, then the threshold can be lowered. Finally, if the two applications do not originate from the same location, the threshold can be increased. By doing so, the various factors for grouping applications together can be altered based on location information. This allows grouping for applications associated with a sparse location to be less strict and grouping for applications associated with different locations to be more strict. For example, for two applications from the same sparse location to be grouped together, they require a lower domain name similarity score than if they were from a large location or from different locations. It will be appreciated that domain name similarity score is utilized in the present examples, although the threshold for any application segmentation factor can be altered with location-based enhancements as described. Further, each application within an application segment can be evaluated against each other application within the segment to determine additional groupings.

The terms "large location" and "sparse location" are based on the number of users residing in a particular location. For example, if an enterprise has a large majority of its users residing in the United States, the United States will be considered a large location. Alternatively, such an enterprise may have a small majority of its users residing in South Africa, thus, South Africa would be considered a sparse location. Altering the thresholds as described, applications within sparse locations have a higher chance of being grouped together. Alternatively, applications in different locations have a lower chance of being grouped together.

In addition to domain name similarity, other factors such as port similarity and user similarity can be utilized, each having score thresholds associated therewith. Thus, these thresholds can be modified in the same manner. Again, application data such as port, users, and domain name can be collected via the cloud-based system 100 for determining similarities therebetween. In various embodiments, determining port similarity, user similarity, and domain name similarity between two applications can be facilitated by dedicated systems of the cloud-based system 100. The following provides various examples of score threshold requirements for application segmentation factors used for grouping applications based on location data.

Two apps from the same large location [domain_name_similarity: 80, port_similarity: 40, user_similarity: 20]

Two apps from the same sparse location [domain_name_similarity: 70, port_similarity: 0, user_similarity: 0]

Two apps from unknown locations [domain_name_similarity: 85, port_similarity: 50, user_similarity: 20]

Two apps from different locations [domain_name_similarity: 90, port_similarity: 50, user_similarity: 20]

It can be seen that the associated thresholds for each application segmentation factor are altered based on the location information of the two applications in question. Again, when the two applications are from the same large location, the thresholds can be assumed as the default. Additionally, when the two applications are from the same sparse location, the thresholds can be reduced. Further, when the two applications are from unknown locations, the thresholds can be raised. Finally, when the two applications are from different locations, the thresholds can be raised. The thresholds associated with each of the scenarios described above can be configured at an enterprise level, allowing each customer of the cloud-based system to tailor the effectiveness/influence of location data on their application segments.

The location information of a particular application can be derived from data collected from monitoring traffic associated with an enterprise. That is, the location of an application can be defined based on the public IP address of the application. Similarly, locations of users, for determining large and sparse locations, can be determined based on a nearest data center location from the point of use of the applications and the public IP address of the users. Defining a large location vs a sparse location can be based on the percentage of an enterprise's users residing in a particular location. For example, the threshold for a large location can be 25%. Thus, if a particular location houses more than 25% of an enterprise's users, it can be considered a large location. Alternatively, if a particular location houses less than 25% of an enterprise's users, it can be considered a sparse location. It will be appropriate that the threshold for defining a large location can be any value and can be configured and tailored for each customer of the cloud-based system 100.

As described, the present location-based application segmentation enhancements can be utilized to further narrow application segment recommendations. That is, responsive to receiving one or more application segment recommendations, the present systems can be utilized to further enhance, and provide updated application segment recommendations.

In various embodiment, the present location-based application segmentation enhancements can be utilized as an enhancement in the various processes for generating application segments described herein. That is, the location-based application segmentation enhancements can be utilized in process 600 for generating zero-trust policy for application access based on sequence-based application segmentation. The process 600 includes obtaining log data for a plurality of users of an enterprise where the log data relates to usage of a plurality of applications by the plurality of users and user metadata; analyzing the log data to determine one or more sequential patterns of application access; determining i) app-segments that are groupings of application of the plurality of applications and ii) user-groups that are groupings of users of the plurality of users, based on the log data (including user metadata), the one or more sequential patterns of application access, and location data of the plurality of applications; and providing access policy of the plurality of applications based on the user-groups and the app-segments.

In such embodiments, the location data can be utilized as described herein to further narrow the generated application segments during the initial generation process. Additionally, in various embodiments, the location-based application segmentation enhancement process can be utilized at any point, on existing application segments, to further generate more specific location-based segments. Again, the present location-based application segments increase security by decreasing the attack surface for malicious actors to move laterally within an enterprise environment.

Process for Location-Based Application Segmentation

Figure 16:
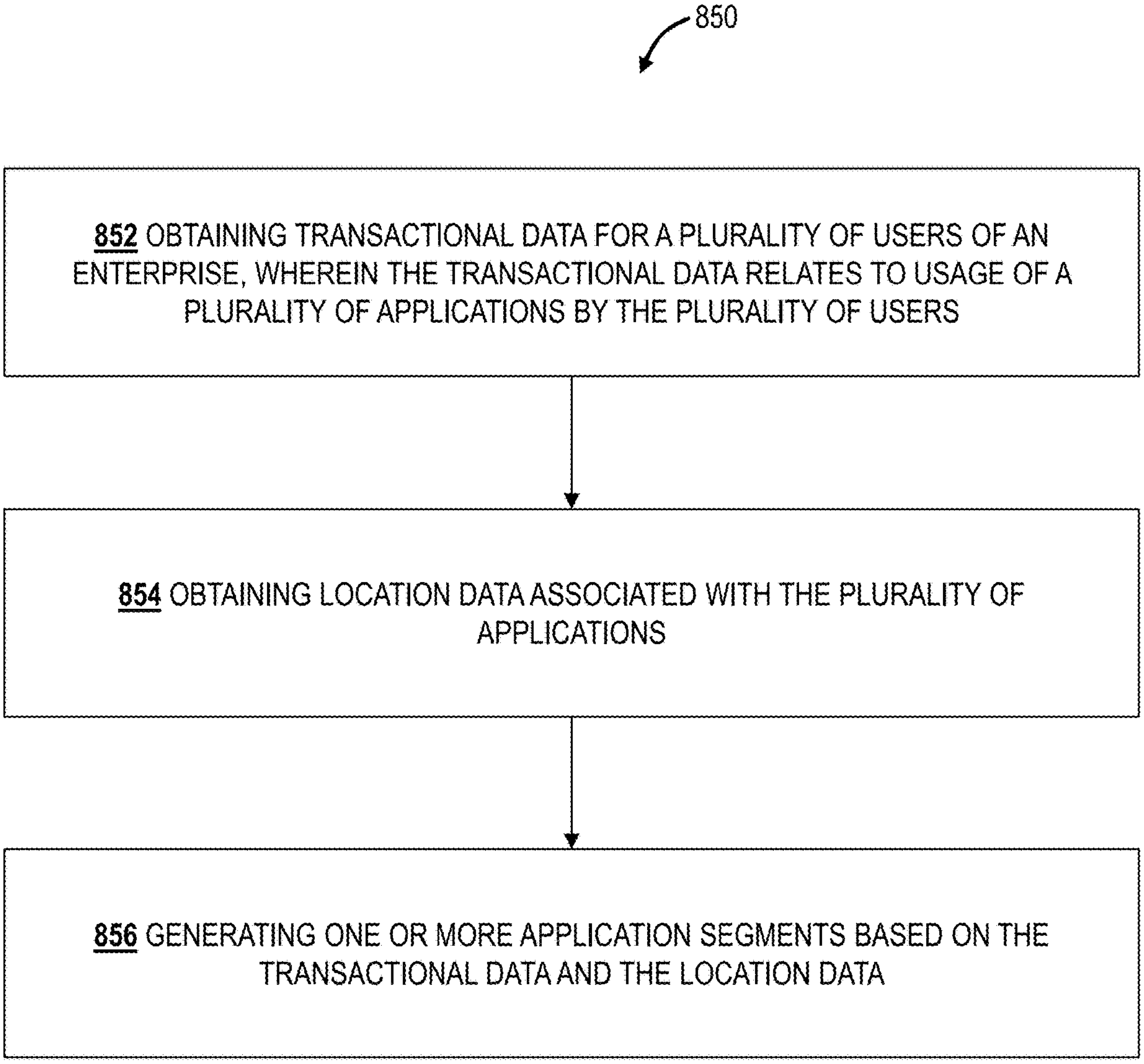
FIG. 16 is a flowchart of a process for generating location-based application segments.

FIG. 16 is a flowchart of a process 850 for generating location-based application segments. The process 850 contemplates implementation as a method with steps, via a processor configured to implement the steps, via the cloud-based system 100 configured to implement the steps, via the server 200 configured to implement the steps, and via a non-transitory computer-readable storage medium having computer readable code stored thereon for programming at least one processor to perform the steps.

The process 850 includes obtaining transactional data for a plurality of users of an enterprise, wherein the transactional data relates to usage of a plurality of applications by the plurality of users (step 852); obtaining location data associated with the plurality of applications (step 854); and generating one or more application segments based on the transactional data and the location data (step 856).

The process 850 can further include providing access policy of the plurality of applications based on the one or more application segments. The steps can further include receiving one or more preexisting application segments, wherein the transactional data and location data are associated with applications within the one or more preexisting application segments; and determining a need for generating one or more additional application segments based on the transactional data and location data. The determining can include determining application usage overlaps within the one or more preexisting application segments, and wherein the generating is performed based thereon. The generating can include determining one or more similarity scores associated with one or more factors between each of the plurality of applications and grouping one or more of the plurality of applications based thereon. The one or more factors can include domain name similarity, port similarity, and user similarity. The grouping can be based on a similarity score threshold associated with each of the one or more factors. Each of the thresholds associated with each of the one or more factors can be altered based on the location data. Each of the thresholds can be (i) increased based on two applications being within a same large location and (ii) decreased based on two applications being within a same sparse location. The steps can further include determining one or more large locations and one or more sparse locations of the enterprise associated with the plurality of applications.

SDLC-Based Application Segmentation

Typically, customers of the cloud-based system 100 utilize sets of applications which differ from each other based on a Software Development Life Cycle (SDLC) environment which they are hosted on. That is, applications are typically hosted in a plurality of environments such as production environments, development environments, testing environments, and others of the like for performing tasks such as developing new features for the application, testing the application, etc. Based on this, customers can benefit from grouping such applications together.

The present disclosure provides systems and methods for creating more accurate application segments based on such SDLC information. That is, in various embodiments, responsive to creating one or more application segments via the various methods described herein, the present processes for SDLC-based application segmentation can be utilized to further define one or more additional application segments for customers of the cloud-based system. Again, the one or more additional application segments can be generated via the present processes based on one or more previously generated application segments, or a list of un-segmented customer applications.

The techniques described herein group together applications from different SDLC environments into separate application segments. In various embodiments, the systems are adapted to detect key words within applications to determine if one or more applications should be segmented together. That is, various key words can be configured in the system for the system to check for. For example, "dev", "prod", and "test" can be present in an application name and can indicate that the application is associated with a development, production, or test environment. Various environment key words that can be used to detect, within an application name, that the application is associated with a specific environment include, but are not limited to:

prod, prd, test, tst, qa, stage, staging, stg, dev, training, uat, p, pd, q, d, dv, s, st, and others of the like.

As can be seen, the key words can include very small strings, some only a single character in length. These key words are used by the present systems to detect applications of interest.

The present process includes performing various similarity measurements between portions of application domains. In various embodiments, a suffix and prefix of each domain is inspected. In the present disclosure, a prefix of an application domain is everything that is present before the first period, while the suffix is everything that appears after the first period. For example, if an application domain is "dev-compute.acme.com", the prefix of this application domain is "dev-compute", and the suffix is "acme.com".

In various embodiments, the process starts by defining a set of applications, the set of applications being the applications that will be processed by the present SDLC-based segmentation. Various embodiments can consider all applications that have not been segmented by another technique, or applications that are in an application segment. For example, if there are 10,000 total applications, and 2,000 of them have already been segmented, the remaining 8,000 applications can be processed, and the systems can try to segment those applications using the present SDLC-based segmentation process. Alternatively, if an application segment includes 100 applications, the present processes can be performed on those 100 application domains to further create more specific SDLC-based application segments. In a first step, the process includes creating application/domain pairs for all possible application combinations from the applications in the defined set of applications. The number of application combinations can be represented by the following formula, where N is the number of applications in the set of applications.

$$N(N-1)/2$$

Once all domain pairs are created, for each domain pair, the process includes filtering the domain pairs based on their prefixes and suffixes. That is, the system only considers pairs where the suffixes are the same, and where a similarity score of the prefixes is above a predefined threshold, for example, above 70% similar. By performing the described filtering, the number of domain pairs can be reduced considerably. In various embodiments, the similarity score can be derived via any known string similarity algorithms.

For the remaining domain pairs, the systems then check for the presence of environment key words in the application prefixes, and filter for combinations where at least one application name in a pair includes an environment key word. That is, a second filtering process is performed to only retain application domain pairs where at least one of the application domains in the pair includes an environment key word in its prefix. This further reduces the number of application pairs to be considered for segmentation and eliminates any further calculations in the segmenting process.

In a next step, for all remaining domain pairs, the environment key words are removed, and a complete similarity is calculated for each pair. That is, for each pair of application domains, any environment key words are removed from the domains, and a similarity score is derived for the pair of domains, the complete similarity score meaning the entire domains are compared, not only the prefix as done before. The application pairs can then be filtered further based on their similarity scores. In various embodiments, the similarity threshold for retaining a pair of applications can be set higher than previous steps, for example, the threshold for this similarity comparison step can be set to 90%. Thus, any application pairs having a similarity lower than the threshold will be removed from the set, and the remaining set of application pairs will be further reduced.

These filtering steps can be contemplated as a first filtering, a second filtering, and a third filtering, where each filtering step is based on the previous, further narrowing the number of application pairs after each filtering step.

Figure 17:
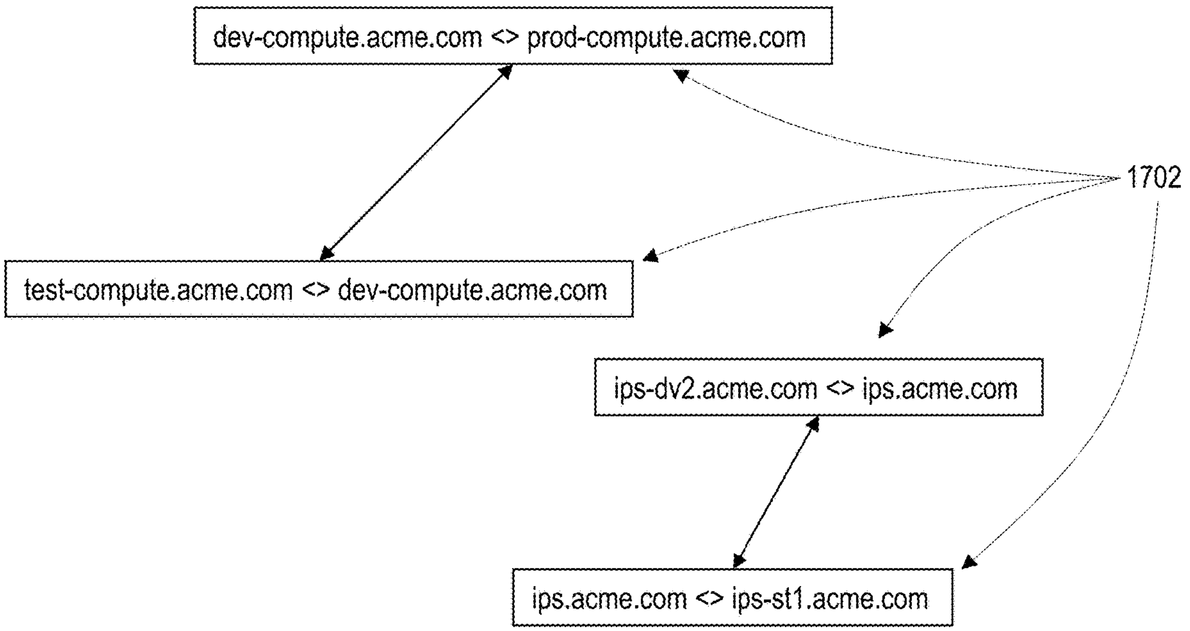
FIG. 17 is a graphical representation of application pairs for segmentation.

In a next step, all remaining pairs of applications must be segmented. The creation of application segments from these remaining pairs includes creating edges between these final domain pairs, and generating application segments based on pairs containing matching application domains. This can be represented in a graphical form. FIG. 17 is a graphical representation of application pairs for segmentation. In the example shown in FIG. 17, the final set of application pairs 1702, after the plurality of filtering steps described above, includes the application pairs 1702 shown. Based on these application pairs containing a same application domain, they can be connected. For example the pair "dev-compute.acme.com"< > "prod-compute.acme.com" and the pair "test-compute.acme.com"< > "dev-compute.acme.com" both contain the application domain "dev-compute.acme.com", thus, the two pairs can be connected. Based on the connections between application pairs 1702, application segments can be defined. That is, all application pairs that are connected as described can be combined and defined as an application segment after removal of duplicate domains. Thus, in the example shown in FIG. 17, two application segments would be defined, a first application segment including the applications "dev-compute.acme.com", "prod-compute.acme.com", and "test-compute.acme.com", while the second application segment would include "ips-dv2.acme.com", "ips.acme.com", and "ips-st1.acme.com". The present example is shown having a small number of application pairs as the final set of application pairs for simplicity, although it will be appreciated that much larger numbers of applications and application pairs can be processed via the present steps for defining SDLC-based application segments.

SDLC-Based Application Segmentation Process

Figure 18:
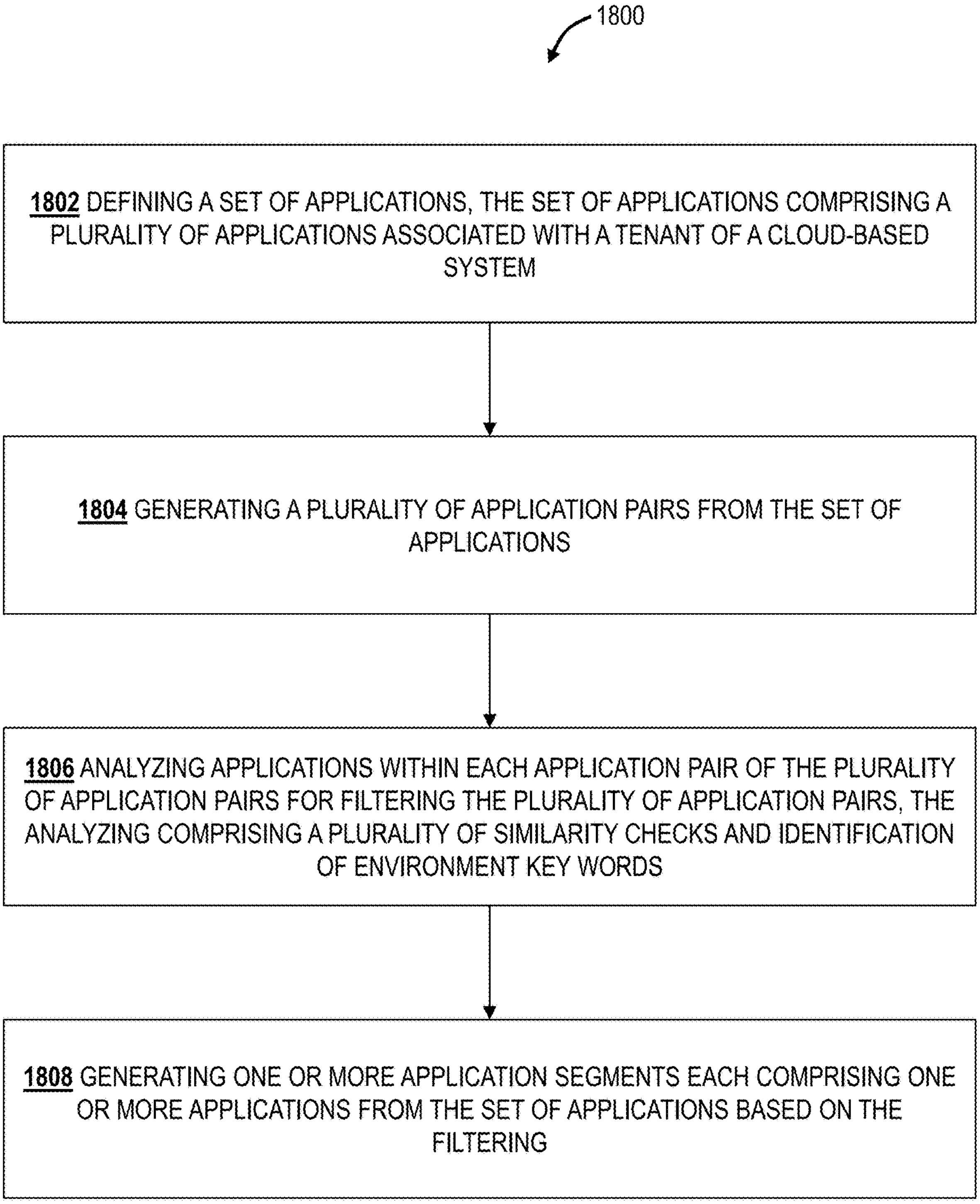
FIG. 18 is a flowchart of a process for generating SDLC-based application segments.

FIG. 18 is a flowchart of a process 1800 for generating SDLC-based application segments. Again, the present steps can be implemented as a method with steps, via a processor configured to implement the steps, via the cloud-based system 100 configured to implement the steps, via the server 200 configured to implement the steps, and via a non-transitory computer-readable storage medium having computer readable code stored thereon for programming at least one processor to perform the steps. The process 1800 includes defining a set of applications, the set of applications including a plurality of applications associated with a tenant of the cloud-based system (step 1802); generating a plurality of application pairs from the set of applications (step 1804); analyzing applications within each application pair of the plurality of application pairs for filtering the plurality of application pairs, the analyzing including a plurality of similarity checks and identification of environment key words (step 1806); and generating one or more application segments each including one or more applications from the set of applications based on the filtering (step 1808).

The process 1800 can further include performing a first filtering of the plurality of application pairs based on a similarity of a domain prefix and suffix of the applications within each application pair; performing a second filtering of the plurality of application pairs based on a presence of an environment key word within domains of the applications within each application pair; performing a third filtering of the plurality of application pairs, the third filtering including removing any environment key words from application domains and filtering the plurality of application pairs based on a similarity of domains of the applications within each application pair after removal of environment key words; and generating one or more application segments based on any remaining application pairs. The first filtering can include only maintaining application pairs of the plurality of application pairs which contain applications who's suffixes are the same, and who's prefix similarity is above a threshold. The second filtering can include only maintaining application pairs of the plurality of application pairs which contain at least one application domain that includes an environment key word. The third filtering can include only maintaining application pairs of the plurality of application pairs which contain applications who's domain similarity score is above a threshold after any environment key words are removed. The set of applications can include applications that have not been included in any application segments for the tenant. The set of applications can include applications within a specific application segment. The steps can further include receiving a list of environment key words for performing the identification. The list of environment key words can include one or more environment key words each associated with a Software Development Life Cycle (SDLC) environment. Generating one or more application segments can include combining a plurality of application pairs.

Port Usage-Based Application Segmentation

Organizations may prefer application segments that contain applications that belong to a particular application type. Based on this need, the present systems and methods include processes for generating application segments based on port usage of applications. That is, using the present segmentation technique, the present systems can detect application types by analyzing port usage.

Typically, application types cannot be derived directly from application names, because there is typically no reference to the application type within its name/domain. Therefore, the present process includes determining an applications port usage, and from the port usage, the systems can determine and tag the applications with an application type for segmentation. FIG. 19 is a table 1900 of example application types. As an example, assume the application type "active directory" is known to use ports 445 and 389 are used because these two ports are predominantly used for active directory. Based thereon, the systems can check all applications and determine what ports are used. If an application uses either port 445 and/or port 389, then the systems can determine and tag that application as belonging to the active directory type. Because each application type is associated with specific ports, the systems can tag all applications as belonging to a specific application type based on the ports used by each application.

In various embodiments, steps for performing the present port-based application segmentation include defining a set of applications. Again, the set of applications being the applications that will be processed by the present port-based segmentation. Various embodiments can consider all applications that have not been segmented by another technique, or applications that are in an application segment for further segmentation. Thus, the set of applications can include all applications that are not currently in a segment, or applications within a specific segment. For each application in the set of applications, the systems then rank the ports used for each application based on transaction volume. That is, the systems determine which ports each application uses most frequently by creating a ranked port list for each application. Based on this, the systems check for the presence of ports specific to a particular application type in the ranked port list of each application. In various embodiments, the systems check for the presence of ports of different application types in a sequential order. Therefore, based on the sequential order, if an application is tagged with a specific application type due to the presence of a specific port, it will not be checked for other ports. For example, if the sequential order of application types includes Printer->AD->SAP->SSH->PostgreSQL->MsSQL-> . . . , then if an application is tagged with PostgreSQL due to presence of an associated port, it won't be checked for other ports. In various embodiments, an application is tagged with a specific application type if its associated port is within the application's top three used ports from the ranked port list. After performing the described steps for each application in the set of applications, applications can be segmented based on their tagged application type.

The sequential application type determination can be contemplated as follows. Utilizing the sequential order defined above, if there are 200 applications within the set of applications, the systems will check all 200 applications for if they belong to the Printer application type. Next, for example, if 50 of those applications satisfy the requirements for being tagged as a Printer application, the remaining 150 applications will then be checked against the AD application type. Next, for example, if 20 of those applications satisfy the requirements for being tagged as an AD application, the remaining 130 applications will then be checked against the SAP application type. This is repeated for each application type in the sequence until there are no more application types. For any remaining applications that have not been tagged after this sequential process, a different segmentation process can be utilized.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc., described herein can be used in any and all combinations with each other.

What is claimed is:

1. A non-transitory computer-readable storage medium having computer readable code stored thereon for programming at least one processor associated with a cloud-based system to perform steps of:

defining a set of applications, the set of applications comprising a plurality of applications associated with a tenant of the cloud-based system;

generating a plurality of application pairs from the set of applications;

analyzing applications within each application pair of the plurality of application pairs for filtering the plurality of application pairs, the analyzing comprising a plurality of similarity checks and identification of environment key words; and generating one or more application segments each comprising one or more applications from the set of applications based on the filtering;

wherein the analyzing and generating further comprise:

performing a first filtering of the plurality of application pairs based on a similarity of a domain prefix and suffix of the applications within each application pair;

performing a second filtering of the plurality of application pairs based on a presence of an environment key word within domains of the applications within each application pair;

performing a third filtering of the plurality of application pairs, the third filtering comprising removing any environment key words from application domains and filtering the plurality of application pairs based on a similarity of domains of the applications within each application pair after removal of environment key words; and generating one or more application segments based on any remaining application pairs.

2. The non-transitory computer-readable storage medium of claim 1, wherein the first filtering comprises only maintaining application pairs of the plurality of application pairs which contain applications who's suffixes are the same, and who's prefix similarity is above a threshold.

3. The non-transitory computer-readable storage medium of claim 1, wherein the second filtering comprises only maintaining application pairs of the plurality of application pairs which contain at least one application domain that includes an environment key word.

4. The non-transitory computer-readable storage medium of claim 1, wherein the third filtering comprises only maintaining application pairs of the plurality of application pairs which contain applications who's domain similarity score is above a threshold after any environment key words are removed.

5. The non-transitory computer-readable storage medium of claim 1, wherein the set of applications comprises applications that have not been included in any application segments for the tenant.

6. The non-transitory computer-readable storage medium of claim 1, wherein the set of applications comprises applications within a specific application segment.

7. The non-transitory computer-readable storage medium of claim 1, wherein the steps comprise:

receiving a list of environment key words for performing the identification.

8. The non-transitory computer-readable storage medium of claim 7, wherein the list of environment key words comprises one or more environment key words each associated with a Software Development Life Cycle (SDLC) environment.

9. The non-transitory computer-readable storage medium of claim 1, wherein generating one or more application segments comprises combining a plurality of application pairs.

10. A method implemented in a cloud-based system comprising steps of:

defining a set of applications, the set of applications comprising a plurality of applications associated with a tenant of the cloud-based system;

generating a plurality of application pairs from the set of applications;

analyzing applications within each application pair of the plurality of application pairs for filtering the plurality of application pairs, the analyzing comprising a plurality of similarity checks and identification of environment key words; and generating one or more application segments each comprising one or more applications from the set of applications based on the filtering;

wherein the analyzing and generating further comprise:

performing a first filtering of the plurality of application pairs based on a similarity of a domain prefix and suffix of the applications within each application pair;

performing a second filtering of the plurality of application pairs based on a presence of an environment key word within domains of the applications within each application pair;

performing a third filtering of the plurality of application pairs, the third filtering comprising removing any environment key words from application domains and filtering the plurality of application pairs based on a similarity of domains of the applications within each application pair after removal of environment key words; and generating one or more application segments based on any remaining application pairs.

11. The method of claim 10, wherein the first filtering comprises only maintaining application pairs of the plurality of application pairs which contain applications who's suffixes are the same, and who's prefix similarity is above a threshold.

12. The method of claim 10, wherein the second filtering comprises only maintaining application pairs of the plurality of application pairs which contain at least one application domain that includes an environment key word.

13. The method of claim 10, wherein the third filtering comprises only maintaining application pairs of the plurality of application pairs which contain applications who's domain similarity score is above a threshold after any environment key words are removed.

14. The method of claim 10, wherein the set of applications comprises applications that have not been included in any application segments for the tenant.

15. The method of claim 10, wherein the set of applications comprises applications within a specific application segment.

16. The method of claim 10, wherein the steps comprise:

receiving a list of environment key words for performing the identification.

17. The method of claim 16, wherein the list of environment key words comprises one or more environment key words each associated with a Software Development Life Cycle (SDLC) environment.

18. The method of claim 10, wherein generating one or more application segments comprises combining a plurality of application pairs.

* * * * *